United States Patent
Hawthorne et al.

Patent Number: 5,698,169
Date of Patent: Dec. 16, 1997

[54] METHODS AND AGENTS FOR THE EXTRACTION OF CESIUM AND STRONTIUM FROM NUCLEAR WASTE

[75] Inventors: M. Frederick Hawthorne, Encino; Gary B. Dunks, Upland, both of Calif.

[73] Assignee: Coremetals Research, Inc., Encino, Calif.

[21] Appl. No.: 459,618

[22] Filed: Jun. 2, 1995

Related U.S. Application Data

[63] Continuation-in-part of Ser. No. 427,007, Apr. 21, 1995.
[51] Int. Cl.$^6$ ............................................. C01F 1/00
[52] U.S. Cl. ................... 423/2; 423/157; 423/181; 534/10; 556/8; 556/12; 210/634; 210/500.27; 210/651
[58] Field of Search .................. 423/2, 157, 181; 534/10; 502/152, 158; 556/8, 9, 12, 403, 443, 450; 568/4; 210/500.27, 634, 651

[56] References Cited

U.S. PATENT DOCUMENTS

| | | | |
|---|---|---|---|
| 3,804,632 | 4/1974 | Bigelow | 430/596 |
| 5,162,466 | 11/1992 | Karol et al. | 526/132 |
| 5,214,173 | 5/1993 | Jordan et al. | 556/8 |

OTHER PUBLICATIONS

Miller, R.L. et al., "Extraction of Cesium and Strontium Into Hydrocarbon Solvent Using Tetra–C–Alkyl Cobalt Dicarbollide," *Solvent Extraction and Ion Exchange*, 13(5):813–827 (1995).

Kyrs, M. et al., "Rapid Concentrating of Radiostrontium from Model Fallout, Drinking and Technological Water, Using Solvent Extraction with Cobalt Dicarbollide and Slofavol 909," *J. of Radioanalytical and Nuclear Chemistry*, 172(2):213–221 (1993).

Rais, J. et al., "The Distribution of Alkali Metal, Ammonium, and Tetraethylammonium Dipicrylaminates Between Water and Nitrobenzene Phases," *J. Inorg. Nucl. Chem.* 30:611–619 (1968).

Hawthorne, M.F. and Andrews, T.D., "Carborane Analogues of Cobalticinium Ion," reprinted from *Chem. Comm.* 19 (Oct. 6, 1965).

Hawthorne, M.F. et al., "Carbametallic Boron Hybride Derivatives. I. Apparent Analogs of Ferrocene and Ferricinium Ion," *J. Am. Chem. Soc. Comm. to the Editor* 87(8):1818–1819 (1965).

Callahan, K.P. and Hawthorne, M.F., "Ten Years of Metallocarboranes," *Adv. Organomet. Chem.* 14:145–186 (1976).

Rais, J. et al., "Extraction of Alkali Metals into Nitrobenzene in the Presence of Univalent Polyhedral Borate Anions," *J. Inorg. Nucl. Chem.* 38(7):1376–1378 (1976).

Scasnar, V. and Koprda, V., "Extraction of $^{137}$Cs into Nitrobenzene by Cobalt Dicarbolide," *Radiochem. Radioanal. Lett.* 34(1):23–28 (1978).

Vanura, P. et al., "Extraction of Strontium with Dicarbolide in the Presence of Polyethylene Glycol," *Collect. Czech. Chem. Commun.* 44:157–166 (1979).

Chem Abs., Abstract No. 93:244759, Selucky et al., "Study of the Possibility of Using Dicarbollides to Extract Cesium and Strontium from Waste Radioactive Solutions," *Ustav Jad. Vyzk.* [Rep.], UJV 5069 (1979).

(List continued on next page.)

*Primary Examiner*—Ngoclan Mai
*Attorney, Agent, or Firm*—Christensen O'Connor Johnson & Kindness PLLC

[57] ABSTRACT

Methods and agents for extracting cesium and strontium ions from aqueous solutions, including aqueous fission product waste solutions, are disclosed using substituted metal dicarbollide and/or dicarbaextrañide ions containing one or more chemical groups that increase solubility of the substituted metal dicarbollide or dicarbaextrañide ions in non-nitrated, non-chlorinated solvents, or using metal dicarbollide or dicarbaextrañide ion-substituted silicones.

41 Claims, 2 Drawing Sheets

OTHER PUBLICATIONS

Matel, L. et al., "Radiolysis of the Bis(1,2-Dicarbollyl)Cobalt(III) Ion in Nitrobenzene-Bromoform Mixture. IV. Radiation and Chemical Stability of the Original and Arising Compounds," *Radiochem. Radioanal. Lett.* 46(1-2):1-6 (1981).

Matel, L. et al., "B-Halogen Derivatives of the Bis(1,2-Dicarbollyl)Cobalt(III) Anion," *Polyhedron* 1(6):511-519 (1982).

Scasnar, V. and Koprda, V., "Extraction Chromatographic Concentration of $^{137}Cs$ From a Mixture of Radionuclides," *Radiochem. Radioanal. Lett.* 50(6):333-343 (1982).

Selucky, P. et al., "A Rapid Method for the Separation of $^{90}Sr$ for its Determination in a Mixture with Long-Lived Fission Products," *Radiochem. Radioanal. Lett.* 38(4):297-302 (1979).

Selucky, P. et al., "Extraction of Fission Products With 1,2-Dichloroethane Solutions of Hexabromo Derivative of Cobalt Dicarbollide from Nitric Acid Medium," *J. Radioanal. Nucl. Chem.* 148(2):227-233 (1991).

Chem. Abs., Abstract No. 119:189543, Babain, V.A. et al., "Extraction of Cesium and Strontium by Solutions of Chlorinated Cobalt Dicarbollide in Diethylene Glycol Bis(Tetrafluoropropyl) Ether," *Radiokhimiya* 35(2):81-85 (1993).

Chem Abs., Abstract No. 116:119859, Ianov, I.M. et al., "Solvent Extraction and Solvation of Alkali Cations in the Form of Salts of Cobalt(III) Dicarbollide Complexes," *Sib. Khim. Zh.* (4):78-81 (1991).

Ha, T.H. et al., "Extraction of Cs, Sr and Ba into Nitrobenzene in the Presence of Cobalt Dicarbollide and Mono-n-Dodecylethers of Polyethylene Glycol," *Nucleon* (2):6-9 (1993).

Chem. Abs., Abstract No. 114:144702, Zakharkin, L.I. et al., "Bis(1,2-Dicarbollyl)Cobalt Anion as a Crosslinking Agent for Polystyrene," *Plast. Massy* (11):61-63 (1990).

El Said, N. and Macasek, F., "Emulsion Liquid Membrane Extraction of Fission Products Promoted by Polyvalent and Organic Acids," *J. Radioanal. Nucl. Chem.* 163(1):113-121 (1992).

Schulz, W.W. and Bray, L.A., "Solvent Extraction Recovery of Byproduct $^{137}Cs$ and $^{90}Sr$ from $HNO_3$ Solutions -A Technology Review and Assessment," *Sep. Sci. Technol.* 22(2-3):191-214 (1987).

Rais, J. and Selucky, P., "New Trends in the Separation of Cesium, Strontium, and Transplutonides by Extraction Methods," *Nucleon* 1:17 (1992).

Chem. Abs., Abstract No. 109:28850, Rais, J. et al., "Isolation of $^{137}Cs$ and $^{90}Sr$ From PUREX-Type High-Level Waste by Solvent Extraction with Dicarbollide," *Nukleon* (4):13-16 (1987).

Beall, H., "Chapter 9. Icosahedral Carboranes," *Boron Hydride Chemistry*, [Muetterties. ed.], Academic Press, Inc. (1975)

Hawthorne, M.F. et al., "The Preparation and Characterization of the (3)-1,2-and (3)-1,7-Dicarbabodecahydroundecaborate (-1) Ions," *J. Am. Chem. Soc.* 90:862-868 (1968).

Hawthorne, M.F. et al., "Pi-Dicarbollyl Derivatives of the Transition Metals. Metallocene Analogs," *J. Am. Chem. Soc.* 90(4):879-896 (1968).

Ruhle, H.R. and Hawthorne, M.F., "Pi-Dicarbollyl Derivatives of Chromium. Metallocene Analogs," *Inorg. Chem.* 7:2279-2282 (1968).

Le Blanc, M. et al., "The Preparation of 1-Hydroperfluorohexyne, Octyne and Decyne," *J. Fluorine Chem.* 7(5):525-530 (1976).

Adler, R.G. and Hawthorne, M.F., "Determination of the Electronic Properties of Carboranes, Carborane Anions, and Metallocarboranes from Fluorine-19 Nuclear Magnetic Resonance Studies," *J. Am. Chem. Soc.* 92:6174-6182 (1970).

Hawthorne, M.F. and Wegner, P.A., "The Reconstruction of the 1,2-Dicarbaclovododecaborane(12) Structure by Boron-Atom Insertion with (3)-1,2-Dicarbollide Ions," *J. Am. Chem. Soc.* 90:896-901 (1968).

Francis, J.N. and Hawthorne, M.F., "Synthesis and Reactions of Novel Bridged Dicarbollide Complexes Having Electron-Deficient Carbon Atoms," *Inorg. Chem.* 10:594-597 (1971).

Hawthorne, M.F. et al., "17. Icosahedral Carboranes and Intermediates Leading to the Preparation of Carbametallic Boron Hydride Derivatives," *Inorg. Synthesis* 10:91-118 (1967).

Dunks, G.B. et al., "Probable Formation of 13-Atom Polyhedral Complexes Containing $B_{10}C_2H_{12}^{2-}$ and Cobalt," *J. Am. Chem. Soc.* 93:2541-2543 (1971).

Chem. Abs., Abstract No. 105:53807, Kyrs, M. et al., Czech Patent No. 219525, published Aug. 15, 1985.

Prihoda, J. and Kyrs, M., "Extraction of Palladium(II) by the Hexachloro-derivative of Cobalt Dicarbolide From Nitric Acid Medium," *J. Radioanal. Chem.* 80:(1-2):49-54 (1983).

Chem. Abs., Abstract No. 105:208990, Goursot, A. et al., "Electronic Structure of the Dianions $B_{12}H_{12}^{2-}$ and $B_9C_2H_{11}^{2-}$," *Can. J. Chem.* 64(9):1752-1757 (1986).

METHODS AND AGENTS FOR THE EXTRACTION OF CESIUM AND STRONTIUM FROM NUCLEAR WASTE

This is a continuation-in-part of prior application Ser. No. 08/427,077 filed Apr. 21, 1995, now allowed, the benefit of the filing date of which is hereby claimed under 35 U.S.C. § 120.

FIELD OF THE INVENTION

The present invention relates to radionuclide extraction agents and methods for extracting radionuclides from nuclear waste. More particularly, the invention relates to substituted metal dicarbollide and dicarbaextrañide ion complexes and their use as transfer agents for extracting cesium and strontium ions from aqueous nuclear waste.

BACKGROUND OF THE INVENTION

Nearly 500 isotopes are produced in nuclear reactors by fission and irradiation processes. Current options for dealing with high-level wastes resulting from operation of fission reactors (e.g., nuclear power generation) include separation of long-lived uranium and plutonium from other high-level wastes using some form of the PUREX (PlutoniumURaniumEXtraction) Process. The volume of the aqueous effluent from the PUREX process containing the remainder of the high-level wastes, usually referred to as fission products, must then be reduced, and the residue solidified and eventually buried in a suitable repository. The high-level fission products that remain in the aqueous phase subsequent to the PUREX process include $^{137}Cs^{+}$ and $^{90}Sr^{+2}$. These radionuclides have potential commercial value and/or are problematic in subsequent disposal schemes. It has been estimated that 30 years after reactor discharge, $^{137}Cs^{+}$ and $^{90}Sr^{+2}$ account for 98% of the thermal energy and 97% of the penetrating radiation in high-level waste, and dominate the design restrictions of waste repositories. Removal of those two nuclides would have the same effect as aging the waste hundreds of years. Fission-product cesium in freshly discharged spent fuel consists of the stable isotope $^{133}Cs$ and the radioactive isotopes $^{134}Cs$ ($t_{1/2}$=2.1 years), $^{135}Cs$ ($t_{1/2}$=2.3×10$^6$ years), $^{136}Cs$ ($t_{1/2}$=13 days) and $^{137}Cs$ ($t_{1/2}$=30.0 years), with $^{137}Cs$ accounting for about 43% of the total cesium. Fission-product strontium in freshly discharged spent fuel consists of the stable isotope $^{88}Sr$ and the radioactive isotopes $^{89}Sr$ ($t_{1/2}$=50.5 days), $^{90}Sr$ ($t_{1/2}$=29.1 years) and $^{91}Sr$ ($t_{1/2}$=9.5 hours), with $^{90}Sr$ accounting for about 60% of the total strontium.

Various systems have been explored for the large-scale separation of $^{137}Cs^{+}$ and $^{90}Sr^{+2}$ from aqueous wastes including: (1) adsorption followed by precipitation, and (2) extraction. The present invention is directed to extraction agents and processes.

The extraction of rubidium and cesium ions into nitrobenzene using aqueous solutions of tetraphenylborate was reported in 1956, in a thesis by a student at MIT. A few years later, government reports suggested extraction as a viable technique for the removal of cesium ion from nuclear fission waste. See, Smith et al., USAEC HW-76222 (1963) (cited in *J. Inorg. Nucl. Chem.*, 30:611 (1968); Bray et al., USAEC HW-76222 (1963), and Richardson, USAEC HW-75447 (1963).

In the late 1960's and early 1970's, several researchers studied the extraction of alkali metal ions and alkaline earth metal ions from radioactive waste using a variety of agents, including dipicrylamine, picrate, tetraphenylborate, catechol, and catechol derivatives. The extraction of cesium and other ions into various polar organic solvents, such as isoamyl alcohol, nitrobenzene, nitromethane, nitroethane, methylisobutyl ketone, and tributylphosphate was also reported.

The driving force for the extraction of cations from the aqueous phase into the organic phase is thought to be relief of the disruption of hydrogen bonding in the water "structure" caused by the presence of large, non-hydrated or partially hydrated, cations of low charge (e.g., Cs$^+$). The selectivity and efficiency of extraction from the aqueous phase to the nitrobenzene phase is lower for alkaline earth ions (e.g., Sr$^{+2}$), than for alkali metal ions. Thus, the proposed order of extractability is $Ca^{+2} < Sr^{+2} < Li^{+} < Na^{+} < NH_4^{+} < K^{+} < Rb^{+} < Cs^{+}$.

All of the anionic phase transfer agents discussed above decomposed, existed in more than one form in relatively strong nitric acid media, or in some other way were less than satisfactory. For example, in strongly acidic and radioactive extraction environments, tetraphenylborate ion decomposes to carcinogenic benzene, which can complicate subsequent processing.

During the early 1970's, it was reported that some polyhedral boranes could be separated from aqueous systems containing other ions by ether extraction. Extractability was shown to increase with the size of the polyhedron, e.g., $B_3H_8^{-} < B_9H_{14}^{-} < B_{11}CH_{12}^{-} < Co(B_9C_2H_{11})_2^{-}$ (cobalt dicarbollide ion).

The first transition metal dicarbollide ion complex (e.g., iron dicarbollide, Fe(B$_9$C$_2$H$_{11}$)$_2^{-}$) was reported by Hawthorne, et al. in 1965. Previously, Hawthorne et al. had reported the degradation of carborane (B$_{10}$C$_2$H$_{12}$) to dicarbadodecahydroundecaborate (−1) ion (B$_9$C$_2$H$_{12}^{-}$), the precursor of dicarbollide ion (B$_9$C$_2$H$_{11}^{-2}$).

The 1,2-dicarbollide ion (1,2-B$_9$C$_2$H$_{11}$)$^{-2}$ and a transition metal bis-dicarbollide ion complex M(B$_9$C$_2$H$_{11}$)$_2^{-}$, sometimes referred to as a metal dicarbollide ion (or metal dicarbollide complex), have the structures shown below:

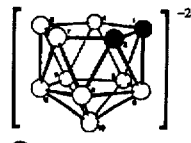

● CH
○ BH

Dicarbollide ion

-continued

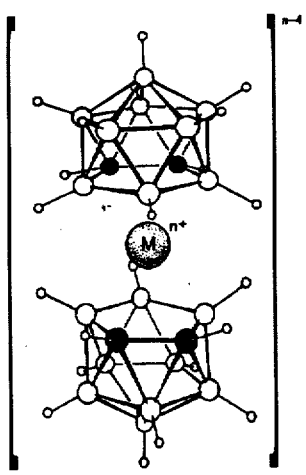

○ B
● C
○ H

Dicarbollide metal complex

The numbering for the atoms in the cage structures of isomeric dicarbollide ions and bis-dicarbollide transition metal complexes in most of the references cited is the "old system" in which the carbon atoms occupy positions 1 and 2 or positions 1 and 7, and the transition metal atom occupies position 3. To avoid confusion with the bulk of the pertinent references, the old numbering system is used herein.

To date, several metal dicarbollide ions have been made, including iron dicarbollide ion, chromium dicarbollide ion, cobalt dicarbollide ion, and nickel dicarbollide ion. The chemistry of these complexes and some of their derivatives has been reviewed several times. See generally, Callahan and Hawthorne, "Ten years of metallocarboranes," *Adv. Organomet. Chem.*, 14:145–86 (1976).

Although the sodium salt of cobalt dicarbollide is a strong electrolyte, the fact that it can be extracted into ether from aqueous solution led to extensive studies of cobalt dicarbollide ion as a phase-transfer agent, including examination of its use as an extraction agent for radionuclides. The following is a representative list of some of the patents and other references that have been published about this topic:

Czech Patent No. 153933 (Rais et al.) and *J. Inorg. Nucl. Chem.*, 38(7):1376–8 (1976) describe the extraction of radionuclides from aqueous solutions using cobalt dicarbollide ion, and reported that, because of the solubility of cesium cobalt dicarbollide in various water-immiscible solvents and the distribution ratios of the cobalt dicarbollide ion in the organic phase relative to the aqueous phase, only polar solvents like nitrobenzene and some chlorinated solvents were viable extraction media.

Scasnar and Koprda, in *Radiochem. Radioanal. Lett.*, 34(1):23–8 (1978), reported the extraction of $^{137}Cs^+$ into nitrobenzene in approximately 99% yield using the protonated form (conjugate acid) of unsubstituted cobalt dicarbollide ion. Subsequent to extraction, aqueous acids (>2M) effectively strip the $Cs^+$ ion from the nitrobenzene phase.

$Sr^{+2}$ ion can be similarly extracted, but requires the addition of a polyethylene glycol (e.g. PEG-400) or p-nonylphenyl-nonaethylene glycol (e.g., Slovafol-909).

Czech Patent No. 153933 (Rais et al.) and *Collect. Czech. Chem. Commun.*, Rais et al.) 44(1):157–66 (1979) describe the extraction of $Sr^{+2}$ from aqueous solvents using metal dicarbollide ion and polyethylene glycol. It is believed that the polyethylene glycol forms a complex with $Sr^{+2}$ through the oxygen atoms of PEG. The hydrocarbon part of PEG is directed outward, making the complex more hydrophobic than the bare ion and thus more easily extracted into an organic solvent.

In general, for the two-phase water-nitrobenzene extraction system, radionuclide extraction selectivity and efficiency does not depend on the cobalt dicarbollide derivative employed. However, although the stability of unsubstituted cobalt dicarbollide ion in nitrobenzene toward $HNO_3$ decreases markedly above 2M $HNO_3$, the dibromo- derivative is quite stable to 5M $HNO_3$. Selucky et al., in *Ustav Jad. Vyzk.* [Rep.], UJV 5069 (1979), reported that both chlorination and bromination of boron atoms in the dicarbollide ion cage increases the stability of cobalt dicarbollide ion. Electrophilic substitution on boron atoms of the dicarbollide ion cage was reported as early as 1968 by Hawthorne and co-workers. In the mid-1970's, researchers in Czechoslovakia described the dibromination of cobalt dicarbollide complexes in 20% mixtures of bromoform in nitrobenzene, and hydroxylation in chloroform or carbon tetrachloride-saturated aqueous solution under radiation conditions. Direct bromination with bromine in methanol produced the 8,8'-dibromo derivative.

Matel et al. (*Radiochem. Radioanal. Lett.*, 46(1–2):(1–6) (1981) attributed the improved chemical and radiation stability of the brominated products to blockage of the reaction centers, and Goursot et al. (*Can. J. Chem.*, 64(9):1752–7 (1986)) determined the regions of greatest electron density (boron atoms in the 8 position).

Czech Patent No. 242501 describes the 8,8'-dichlorination of transition-metal dicarbollide complexes, including Co(III), Fe(III) and Ni(III). Subsequently, Matel et al., reported in *Polyhedron*, 1(6):511–19 (1982), the chlorination and bromination of cobalt dicarbollide by elemental halogen in alcohols, and γ-induced halogenation by bromoform, chloroform or carbon tetrachloride in polar solvents. Halogenation was reported to proceed alternatively in both cages yielding, successively, 8-; 8,8'-; 8,9,8'-; 8,9, 8',9'-; 8,9,12,8',9'- and 8,9,12,8',9',12'-halogen derivatives.

Czech Patent No. 224890 (Rais et al.) reports the preparation of the hexachloro-derivative of cobalt dicarbollide ion, using elemental chlorine in acetic acid, on the 14 kg scale.

Extraction studies similar to those previously done using unsubstituted cobalt dicarbollide ion were repeated using various halogenated derivatives. For example, Czech Patent No. 224890 reports the extraction of $Sr^{+2}$ using the hexachloro-derivative, and Czech Patent Nos. 219525 (Kyrs et al.) and 224993 (Maeasek et al.) report the separation of $Cs^+$ and $Rb^+$ ion using the dibromo- derivative.

Scasnar et al., in *Radiochem. Radioanal. Lett.*, 50(6) :333–43 (1982) reported a chromatographic procedure for separating $Cs^+$ ions from a fission product mixture, using KEL-F (poly-trifluorochloroethylene) as solid support for cobalt dicarbollide ion or a chlorinated derivative in nitrobenzene.

Selucky et al., in *Radiochem. Radioanal. Lett.*, 38(4): 297–302 (1979), described the development of procedures for the initial separation of $Cs^+$ ion with 0.01M cobalt dicarbollide ion followed by extraction of $Sr^{+2}$ ion with a "hydrophobizing" agent (PEG). The most recent Eastern European work centers around fine tuning the extractions by solvent variations and/or by the addition of "synergetic" phase transfer agents. Thus, Selueky et al., in *J. Radioanal. Nucl. Chem.*, 148(2):227–33 (1991) reported the extraction of fission products from nitric acid media using 1,2-dichloroethane solutions of the hexabromo- derivative of cobalt dicarbollide ion. Babain et al., *Radiokhimiya*, 35(2): 81–5 (1993), proposed diethyleneglycol-bis-(tetrafluoropropyl) ether as an alternative solvent to nitrobenzene for extraction of $Cs^+$ ion and $Sr^{+2}$ ion with chlorinated cobalt dicarbollide ion and Slovafol-909. Ivanov et al., *Sib. Khim. Zh.*, (4):78–81 (1991), reported that toluene/1-octanol and toluene/butyl acetate mixtures may be capable of extracting $Cs^+$ with very little dependence of the extraction efficiency on solvent composition.

Tran et al., in *Nucleon*, (2):6–9 (1993) reported the separation of $Sr^{+2}$ from $Ca^{+2}$ using an organic phase that contained 0.11M lithium cobalt dicarbollide and 1.7% Slovafol-909 in a solution of 40% carbon tetrachloride/60% nitrobenzene. Their studies suggested that the efficiency of alkaline earth extraction increased with the number of ethylene oxide units in the range 2 through 8.

Zakharkin et al., *Plast. Massy*, (11):61–3 (1990) reported the crosslinking of polystyrene using cobalt dicarbollide ion, and proposed it as a sorbant for separation of fission products.

El Said et al., *J. Radionanal. Nucl. Chem.*, 163(1):113–21 (1992) described an "Emulsion Liquid Membrane" system of di-2-ethylhexylphosphoric acid, n-alkane, dipicrylamine and cobalt dicarbollide ion in nitrobenzene stabilized with surfactant (SPAN 80/85), and its use to separate radioactive $Cs^+$ ion, $Sr^{+2}$ ion, $Ce^{+3}$ ion and $Eu^{+3}$ ion from acidic nitrate solution.

The field of fission products extraction was reviewed by Schulz et al., in *Sep. Sci. Technol.*, 22(2–3):191–214 (1987). See, also, Rais et al., *Nucleon*, 1:17 (1992), and *Nukleon*, (4):13–16 (1987).

The $(B_{10}C_2H_{12})^{-2}$ ion, referred to herein as dicarbaextrañide, and the corresponding metal bis-dicarbaextrañide complexes, are structurally related to the dicarbollides and metal bis-dicarbollide complexes, respectively. The $(B_{10}C_2H_{12})^{-2}$ dicarbaextrañide ion was first incorporated into metal complexes by Dunks, McKown and Hawthorne in 1971 and reported in *J. Am. Chem. Soc.*, 93:2541 (1971). Metal bis[$(B_{10}C_2H_{12})^{-2}$] complexes were reported by Dustin, Dunks and Hawthorne in 1973 in *J. Am. Chem. Soc.*, 95:1109 (1973). The structure of dicarbaextrañide and a corresponding $[7,9-B_{10}C_2H_{12})_2M(III)]^-$ metal complex is shown below:

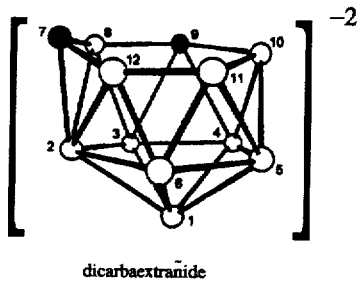

dicarbaextrañide

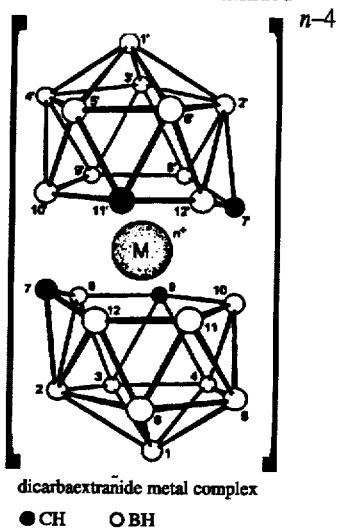

dicarbaextrañide metal complex
● CH   ○ BH

Other agents and methods for extracting cesium and strontium from aqueous nuclear waste are known and/or are being studied. For example, calixarenes have been studied as alkali metal ion complexing agents, and in the extraction of cesium ions from aqueous waste. Their subsequent decomposition has also been studied.

Similarly, crown ethers are well known complexing agents for metal ions and can be tailored to "fit" ions of different sizes. Both $Cs^+$ and $Sr^{+2}$ have been extracted from aqueous systems using crown ethers. Crown ether terminated polysiloxanes in supported liquid membranes have been studied with regard to potassium ion transport. Alkali metal ion transport across polymer membranes has also been studied.

To date, the known technologies for removing high-level fission products (specifically, $^{137}Cs^+$ and $^{90}Sr^{+2}$ ions) from the strongly acidic aqueous effluent generated in most reprocessing procedures have used (1) solvent and complexing agent-intensive zeolite adsorption; (2) environmentally unfriendly solvents such as nitrobenzene and chlorinated solvents as the immiscible organic phase; or (3) agents, such as calixarenes and crown ethers, that tend to be capable of efficiently separating only one of the two fission products of interest. Calixarenes and crown ethers both suffer from the drawback that, because of the strong bonding interaction between metal ions and the oxygen atoms of the ligands, stripping the metal ions from the complexes is often difficult or impossible without destroying the ligands.

What is needed is a system capable of selectively and efficiently extracting both $^{137}Cs^+$ and $^{90}Sr^{+2}$ from high-level fission product waste in a single, integrated process that avoids nitrobenzene, chlorinated solvents, and other drawbacks encountered with known fission product extraction processes.

SUMMARY OF THE INVENTION

The present invention provides novel extraction agents and processes for selectively extracting cesium and strontium ions—and is particularly useful for extracting cesium and strontium ions-including $^{137}Cs^+$ and $^{90}Sr^{+2}$—from aqueous fission product waste. Extraction is accomplished without using nitrobenzene, chlorinated solvents, or other highly toxic, hazardous solvents. Indeed, in one embodiment of the invention, no nonaqueous phase is used at all. In other embodiments, kerosene, xylene, perfluorinated hydrocarbons, silicone oil, or similar materials are used.

According to the present invention, the new extraction agents comprise substituted metal dicarbollide ion and/or substituted metal dicarbaextrañide ion complexes having chemical moieties capable of increasing the solubility of the ions in water immiscible, non-nitrated and non-chlorinated solvents, and modified silicone oils or elastomers in which at least one substituted metal dicarbollide or dicarbaextrañide ion is chemically bound to a silicone (organosiloxane) backbone.

Depending on the identity of the chemical moieties bound to the metal dicarbollide or dicarbaextrañide ion, the extraction agents are soluble in organic solvents, fluorinated hydrocarbons, silicone oils, or similar materials.

The present invention also provides new methods for extracting $Cs^+$ and $Sr^{+2}$ ions from aqueous solutions, using the extraction agents described herein, and is particularly useful for extracting $^{137}Cs^+$ and $^{90}Sr^{+2}$ ions from aqueous nuclear waste.

In one embodiment, extraction of cesium ions from an aqueous phase or solution is facilitated by interaction with substituted metal dicarbollide or dicarbaextrañide ions contained in a nonaqueous phase. Once extracted into the nonaqueous phase, the cesium ions are stripped therefrom by treatment with mineral acid. Polyethylene glycol, or a similar compound, is then added to the aqueous phase, and strontium ions are extracted by interaction with the substituted metal dicarbollide or dicarbaextrañide ions within the nonaqueous phase. Once extracted, the strontium ions can also be stripped from the nonaqueous phase by treatment with mineral acid.

In another embodiment, cesium and strontium ions are extracted from aqueous solution by passage through a semipermeable membrane into an aqueous solution of mineral acid. No nonaqueous phase is used. The semipermeable membrane comprises a silicone elastomer containing pendant metal dicarbollide or dicarbaextrañide ions bound thereto, or, a microporous polymer film which has been impregnated with substituted metal dicarbollide or dicarbaextrañide ions. The metal dicarbollide or dicarbaextrañide ions within the membrane facilitate extraction of cesium and strontium ions into the aqueous acid solution.

BRIEF DESCRIPTION OF THE DRAWINGS

The foregoing aspects and other advantages of this invention will become more readily appreciated by reference to the following detailed description and accompanying drawings, wherein.

DETAILED DESCRIPTION OF THE INVENTION

Figure 1:
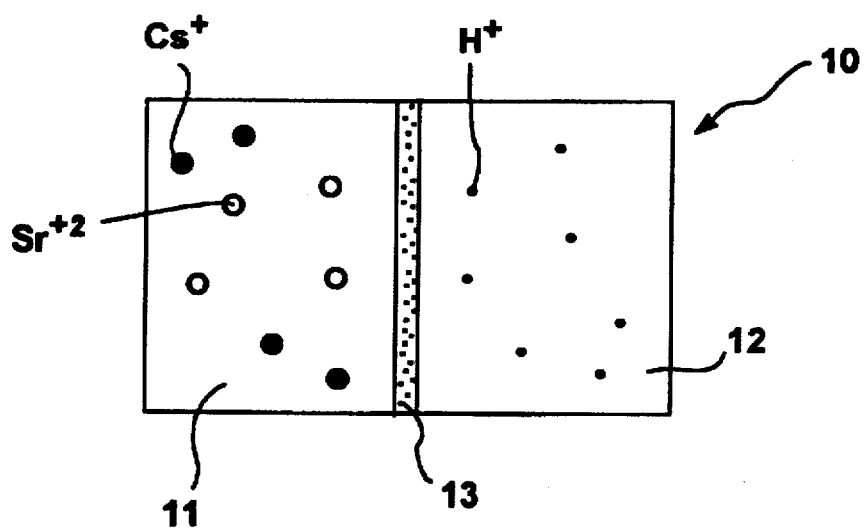
FIG. 1 is a schematic representation of a two compartment extraction apparatus of the invention in which the compartments are separated by a semipermeable membrane.

The present invention provides novel extraction agents and processes for separating cesium ($Cs^+$) and strontium ($Sr^{+2}$) ions from aqueous solutions, and is particularly useful in extracting cesium and strontium ions (including $^{137}Cs^+$ and $^{90}Sr^{2+}$) from aqueous nuclear waste, without using nitrobenzene or chlorinated solvents as the water immiscible organic phase.

The extraction agents of the present invention comprise substituted metal dicarbollide and/or dicarbaextrañide ion complexes having at least one chemical moiety capable of increasing the solubility of the complex in water immiscible, non-nitrated and non-chlorinated solvents. Each such chemical moiety is bound to a boron or carbon atom in either of the dicarbollide or dicarbaextrañide ion cages of the metal complexes. In one presently particularly preferred embodiment, the dicarbollide or dicarbaextrañide ion complexes of the invention comprise at least one R-group substituent having a fluorinated moiety capable of enhancing solubility in fluorinated hydrocarbon solvents, or having an alkyl moiety with a hydrophobicity value ($\pi$) greater than about 4.0, as determined using the procedure of Hansch et al. *Exploring QSAR—Fundamentals and Applications in Chemistry and Biology*, American Chemical Society 1995, the disclosure of which is incorporated herein by reference. The hydrophobicity value represents the contribution of the substituent to a partition coefficient (P) of a compound containing the substituent in a 1-octanol/water partition system. The hydrophobicity values of some illustrative substituents for use in connection with the present invention are as follows:

| Substituent | $\pi$ |
|---|---|
| n-heptyl | 4.44 |
| n-octyl | 4.96 |
| n-dodecyl | 5.88 |
| tetradecyl | 6.98 |
| heptamethyltrisiloxy | 4.20 |
| nonamethyltetrasiloxy | 4.80 |
| undecamethylpentasiloxy | 5.40 |
| tridecamethylhexasiloxy | 6.00 |
| pentadecamethylheptasiloxy | 6.60 |
| heptadecamethyloctasiloxy | 7.10 |
| nonadecamethylnonasiloxy | 7.70 |

Representative extraction agents of the invention are substituted dicarbollides and dicarbaextrañides comprising a compound selected from the group consisting of:

a) a metal dicarbollide ion of the formula:

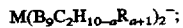

b) a metal dicarbaextrañide ion of the formula:

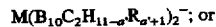

c) a metal dicarbollide or dicarbaextrañide ion-substituted organosiloxane of the formula:

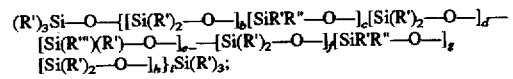

wherein M is a transition metal capable of forming a trivalent oxidation state; R' is methyl or trifluoromethyl; R" is phenyl or fluoro- substituted phenyl; R''' is a metal dicarbollide or dicarbaextrañide ion moiety of the formulae (1) or (2):

 (1)

or

—W—[M(B₁₀C₂H₁₁₋ₐR'ₐ₊₁Z)₂⁻] (2)

where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

—C₆H₅₋ⱼYⱼ where j is 1 to 5, and Y is fluorine, phenyl or fluoro-substituted phenyl; a is 0 to 3; a' is 0 to 4; b, d, f, and h are 0 to 10; c and g are 0 or 1; and e and i are 1 to 10; and each R is independently selected from R₁ or R₂, where R₁ is alkyl having from about 7 to about 10 carbon atoms; fluoro-substituted alkyl having from 2 to about 10 carbon atoms; substituted phenyl of the formula:

—C₆H₅₋ⱼYⱼ where j is 1 to 5, and Y is fluorine, phenyl or fluoro-substituted phenyl, with the proviso that when R'" is a metal dicarbollide ion moiety, R₁ cannot be 1-m-fluorophenyl or 1-p-fluorophenyl; or R₁ is an organosiloxane of the formula:

—W—{[Si(R')₂—O—]ᵦ[SiR"R"—O—]ᵨ[Si(R')₂—O—]ₐ}ₖE where E is —Si(R')₃, —Si(R')₂(C₆H₅) or R'", k is 1 to 10, and R', R", R'", b, c and d are as defined above; and R₂ is selected from the group consisting of chlorine, bromine, methyl and trifluoromethyl; provided that at least one R must be R₁. The extraction agents of the invention additionally comprise the conjugate acid of each of the substituted metal dicarbollides and dicarbaextrañides of the invention. As used herein, the term "alkyl" is intended to include straight chain alkyl groups, as well as the branched chain isomers thereof (i.e., the iso-, sec-, tert-, and other branched chain isomeric forms).

Representative dicarbollide derived extraction agents of the invention include bis(substituted-dicarbollyl) transition metal(III) anions that comprise at least one R₁ substituent. Optionally, the extraction agents of the invention may be "mixed" substituted metal dicarbollide ions; i.e., where one of the dicarbollyl groups contains an R₁ substituent, whereas the other contains an R₂ substituent. Representative extraction agents of the invention also include metal dicarbollide ion-substituted silicones (organosiloxanes). For convenience, the extraction agents of the invention are simply referred to as "substituted metal dicarbollide ions." The extraction agents of the present invention differ structurally from unsubstituted metal dicarbollide ions in that at least one hydrogen atom in either or both dicarbollyl groups has been replaced with a non-hydrogen functional group (e.g., R₁, R₂, etc.) capable of increasing the solubility of the complex in water immiscible solvents. Thus, representative, but nonlimiting examples of extraction agents of the invention include transition metal bis(ligand) complexes in which the following are ligands: 1-n-heptyl-dicarbollide, 1-n-octyl-dicarbollide, 1-n-nonyl-dicarbollide, 1-n-decyl-dicarbollide, 1-isoheptyl-dicarbollide, 1-iso-octyl-dicarbollide, 1-iso-nonyl-dicarbollide, 1-isodecyl-dicarbollide, 1-sec-heptyl-dicarbollide, 1-sec-octyl-dicarbollide, 1-secnonyl-dicarbollide, 1-sec-decyl-dicarbollide, 1-tert-heptyl-dicarbollide, 1-tertoctyl-dicarbollide, 1-tert-nonyl-dicarbollide, and 1-tert-decyl-dicarbollide, 1-perfluoroethyl-dicarbollide, 1-perfluoropropyl-dicarbollide, 1-perfluorobutyl-dicarbollide, 1-perfluoropentyl-dicarbollide, 1-perfluorohexyl-dicarbollide, 1-perfluoroheptyl-dicarbollide, 1-perfluorooctyl-dicarbollide, 1-perfluorononyl-dicarbollide, 1-perfluorodecyl-dicarbollide, [6-(o-fluorophenyl)dicarbollide, [6-(m-fluorophenyl) dicarbollide, and [6-(p-fluorophenyl) dicarbollide, tetramethylphenyldisiloxy dicarbollide, pentamethyldisiloxy dicarbollide, hexamethylphenyltrisiloxy dicarbollide, heptamethyltrisiloxy dicarbollide, octamethylphenyltetrasiloxy dicarbollide, nonamethyltetrasiloxy dicarbollide, decamethylphenylpentasiloxy dicarbollide, undecamethylpentasiloxy dicarbollide, tridecamethylhexasiloxy dicarbollide, pentadecamethylheptasiloxy dicarbollide, heptadecamethyloctasiloxy dicarbollide, nonadecamethylnonasiloxy dicarbollide, [1-(n-ethyl)-dicarbollyl substituted silicone, [1-(n-propyl)-dicarbollyl metal anion substituted silicone, [1-(n-butyl)-dicarbollyl metal anion substituted silicone, [1-(n-pentyl)-dicarbollyl substituted silicone, [1-(n-hexyl)-dicarbollyl substituted silicone, [1-(n-heptl)-dicarbollyl substituted silicone, [1-(n-octyl)-dicarbollyl substituted silicone, [1-(n-nonyl)-dicarbollyl substituted silicone, [1-(n-decyl)-dicarbollyl substituted silicone, and the straight and/or branched chain isomers thereof.

Thus, for the 1,2-dicarbollide isomer, each of the dicarbollyl groups has at least one R₁ group bound to a boron atom (at either the 6 or 8 positions) or a carbon atom. Similarly, for the 1,7-dicarbollide isomer, each of the dicarbollide groups has at least one R₁ group bound to a boron atom (at either the 2 or 9 positions) or to a carbon atom. For mixed R-substituent dicarbollides, an R₁ group is bound to a boron or carbon atom in one of the dicarbollide ion cages, and an R₂ group is bound to a boron or carbon atom in the other dicarbollide ion cage. For dicarbollide substituted silicones, a boron atom in one of the dicarbollide ion cages of the metal dicarbollide ion moiety is bound to an oxygen atom or alkylene group, (—CH₂—)₂₋₁₀, which is bound to a silicon atom in the backbone of an organosiloxane. Alternatively, a carbon atom in one of the dicarbollide ion cages is bound to an alkylene group, which is bound to a silicone atom in the backbone of the organosiloxane. In either case, the other dicarbollyl group may also bear a non-hydrogen substituent.

Representative dicarbaextrañide extraction agents of the invention include bis(substituted-dicarbaextrañyl) transition metal(III) anions that comprise at least one R₁ substituent. Representative extraction agents of the invention also include dicarbaextrañide- ion-substituted silicones (organosiloxanes). For convenience, the extraction agents of the invention are simply referred to as "substituted metal dicarbaextrañide ions." The extraction agents of the present invention differ structurally from unsubstituted metal dicarbaextrañide ions in that at least one hydrogen atom in either or both dicarbaextrañide groups has been replaced with a non-hydrogen functional group (e.g., R₁, R₂, etc.) capable of increasing the solubility of the complex in water immiscible solvents. Thus, representative, but nonlimiting examples of extraction agents of the invention include transition metal bis(ligand) complexes in which the following are ligands: n-heptyl-dicarbaextrañide, n-octyl-dicarbaextrañide, n-nonyl-dicarbaextrañide, n-decyl-dicarbaextrañide, iso-heptyl-dicarbaextrañide, iso-octyl-dicarbaextrañide, iso-nonyl-dicarbaextrañide, iso-decyl-dicarbaextrañide, sec-heptyl-dicarbaextrañide, sec-octyl-dicarbaextrañide, sec-nonyl-dicarbaextrañide, sec-decyl-dicarbaextrañide, tert-heptyl-dicarbaextrañide, tert-octyl-dicarbaextrañide, tert-nonyl-dicarbaextrañide, and tert-decyl-dicarbaextrañide, perfluoroethyl-dicarbaextrañide, perfluoropropyl-dicarbaextrañide, perfluorobutyl-dicarbaextrañide, perfluoropentyl-dicarbaextrañide, perfluorohexyl-dicarbaextrañide, perfluoroheptyl-dicarbaextrañide, perfluorooctyl-dicarbaextrañide, perfluorononyl-dicarbaextrañide, perfluorodecyl-dicarbaextrañide, o-fluorophenyl-dicarbaextrañide, m-fluorophenyl-dicarbaextrañide, and p-fluorophenyl-dicarbaextrañide, tetramethylphenyldisiloxy-dicarbaextrañide, pentamethyldisiloxy-dicarbaextrañide, hexamethylphenyltrisiloxy-dicarbaextrañide, heptamethyltrisiloxy-dicarbaextrañide, octamethylphenyltetrasiloxy-dicarbaextrañide, nonamethyltetrasiloxy-dicarbaextrañide, decamethylphenylpentasiloxy-dicarbaextrañide, undecamethylpentasiloxy-dicarbaextrañide, tridecamethylhexasiloxy-dicarbaextrañide, pentadecamethylheptasiloxy-dicarbaextrañide, heptadecamethyloctasiloxy-dicarbaextrañide, nonadecamethylnonasiloxy-dicarbaextrañide, n-ethyl-dicarbaextrañyl substituted silicone, n-propyl-dicarbaextrañyl substituted silicone, n-butyl-dicarbaextrañyl substituted silicone, n-pentyl-dicarbaextrañyl substituted silicone, n-hexyl-dicarbaextrañyl substituted silicone, n-heptyl-dicarbaextrañyl substituted silicone, n-octyl-dicarbaextrañyl substituted silicone, n-nonyl-dicarbaextrañyl substituted silicone, n-decyl-dicarbaextrañyl substituted silicone, and the straight and/or branched chain isomers thereof.

Thus, for dicarbaextrañyl groups, each has at least one $R_1$ group bound to a boron atom or a carbon atom. For dicarbaextrañyl substituted silicones, a boron atom in one of the dicarbaextrañide ion cages of the metal ion moiety is bound to an oxygen atom or alkylene group, $(-CH_z-)_{2-10}$, which is bound to a silicon atom in the backbone of an organosiloxane. Alternatively, a carbon atom in one of the dicarbaextrañide ion cages is bound to an alkylene group, which is bound to a silicone atom in the backbone of the organosiloxane. In either case, the other dicarbaextrañyl group may also bear a non-hydrogen substituent.

Additionally, in some embodiments, the extraction agents are brominated or chlorinated. Each 1,2-dicarbollyl group can contain up to three Br or Cl atoms in place of H atoms. Generally, such substitution by halogen in dicarbollides occurs at the 8, 9, 12, 8', 9', and/or 12' positions. (The prime (') symbol distinguishes between the two dicarbollyl and/or dicarbaextrañyl groups of the complex.) Each 1,7-dicarbollide group can contain up to two Br or Cl atoms in place of H atoms or hydrocarbon substituents. Generally, such substitution by halogen occurs at the 9, 10, 9' and/or 10' positions. Each dicarbaextrañide ion can contain up to four Br or Cl atoms in place of H atoms. Generally, such substitution by halogen atoms occurs at the 1, 5, 6 and 11 positions in each cage of the complex.

Alkyl- and phenyl-substituted metal dicarbollide and dicarbaextrañide ions exhibit increased solubility in hydrocarbon solvents such as kerosene and xylene, and in 1-octanol, tributylphosphate, and similar solvents. Fluorinated alkyl- and phenyl-substituted metal dicarbollide and dicarbaextrañide ions tend to be soluble in fluorinated alkanes and $arSi(CH_3)_2$—arenes such as fluorinated kerosene, fluorinated biphenyl compounds, fluorinated polyether compounds such as Fomblin Y vacuum pump oil (a perfluoro polyether available from Montedison USA, Inc., Aldrich), and other fluorinated hydrocarbon solvents. Organosiloxane-substituted metal dicarbollide and dicarbaextrañide ions are soluble in silicone oils and elastomers.

The extraction agents of the invention are prepared in a straightforward manner from carborane ($B_{10}C_2H_{12}$) and transition metal halides (e.g., $CoCl_2.nH_2O$, $FeCl_2$, etc.). The particular starting materials and reaction methodologies used depend on several factors, including the empirical formula of the extraction agent being prepared, the particular isomer being prepared (i.e., is the solubilizing chemical moiety bonded to a boron atom or a carbon atom, and at which position) and, in some cases, the identity of the metal atom in the complex. For example, substituted chromium dicarbollide ions are conveniently prepared under anhydrous conditions, but are more difficult to make under aqueous conditions. Substituted cobalt dicarbollide ions, on the other hand, are conveniently prepared under both aqueous and anhydrous conditions.

General synthetic routes to the extraction agents of the present invention will now be described.

1. Substituted Metal Dicarbollide Ions of the Formula: $M(B_9C_2H_{10-a}R_{a+1})_2^-$; R is Bound to Carbon a. Non-halogenated 1,2-Dicarbollide Complexes The general synthetic scheme entails reacting decaborane ($B_{10}H_{14}$) with a terminal alkyne (RCCH) in the presence of an electron donor molecule, such as acetonitrile or dialkyl sulfide (:L) to form an R-substituted 1,2-carborane, (1-R-1, 2-$B_{10}C_2H_{11}$). Degradation of 1,2-carborane with methanolic base (NaOH in $CH_3OH$) yields 1-R-substituted dicarbadodecahydroundecaborate (−1) ion (1,2-$B_9C_2H_{11}R^-$). (For example, 1-propyne yields $(B_9C_2H_{11}CH_3)^-$; 3,3,3-trifluoro-1-propyne yields $(B_9C_2H_{11}CF_3)^-$; etc.

Reaction with a transition metal halide yields an R-substituted metal dicarbollide ion, $M(B_9C_2H_{10}R)_2^-$, more precisely, a bis(R-substituted -1,2-dicarbollyl)metal(III) (−1) ion, as a mixture of 1-R- and 2-R-substituted isomers.

Thus, the first two steps of the synthesis are:

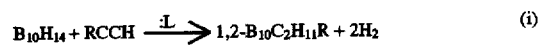   (i)

and

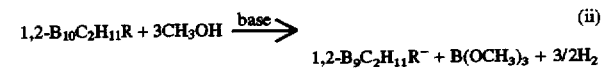   (ii)

The metal dicarbollide ion can be formed by reacting the R-substituted dicarbadodecahydroundecaborate (−1) ion with a metal halide, in the presence of an aqueous base. Thus, for cobalt, the reaction is

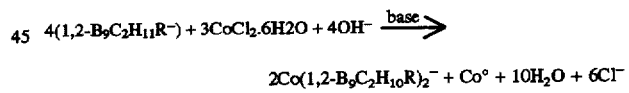

Alternatively, the substituted metal dicarbollide ion is formed using a non-aqueous approach. First, the R-substituted-dicarbadodecahydroundecaborate anion is isolated as the trimethylammonium salt (by, e.g., treating it with an aqueous solution of trimethylammonium chloride). The salt is then reacted with sodium hydride (NaH) in dry tetrahydrofuran (THF), yielding an anhydrous THF solution of an R-substituted dicarbollide ion $(B_9C_2H_{10}R)^{2-}$. Reaction with an anhydrous metal halide yields the R-substituted transition metal dicarbollide ion:

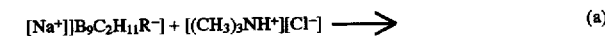   (a)

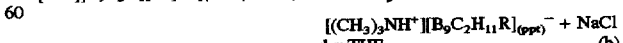

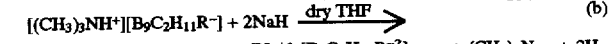   (b)

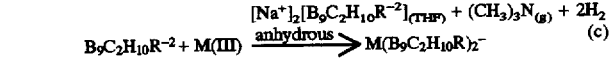

   (c)

Whether prepared under aqueous or nonaqueous conditions, the substituted metal dicarbollide ion can be isolated as a salt (for example, a cesium salt, by treatment with CsCl) and, if desired, can be convened to the conjugate acid, $[H^+][M(B_9C_2H_{10}R)_2^-]$, either by reaction with a strong mineral acid or by passage through a protonated ion exchange column.

b. Halogenated Complexes

Transition metal dicarbollide complexes and their derivatives can be chlorinated or brominated by elemental halogen in polar solvents. Substitution proceeds in the unsubstituted complex alternatively in both cages yielding successively 8-; 8,8'-; 8,9,8'-; 8,9,8',9'-; 8,9,12,8',9'- and 8,9,12,8',9',12'-halogen derivatives. The degree of halogenation is controlled by the reagent stoichiometry and reaction conditions.

c. Non-Halogenated, 1,7-Dicarbollide Complexes

Meta-Carborane $(1,7-B_{10}C_2H_{12})$ is prepared by thermal rearrangement of the carbon atoms in ortho-carborane $(1,2-B_{10}C_2H_{12})$ using well known literature methods. See, e.g., Beall, "Icosahedral Carboranes," *Boron Hydride Chemistry*, Chapter, 9, Muetterties, Ed., Academic Press, Inc., 1975. Degradation of metacarborane to 1,7-dicarbadodecahydroundecaborate(−1) and subsequent proton removal to produce 1,7-dicarbollide ion is accomplished by literature methods similar to those described for the 1,2-isomer above. See, e.g., Hawthorne et al., "The Preparation and Characterization of the 1,2- and 1,7-Dicarbadodecahydroundecaborate (−1) Ions," *J. Amer. Chem. Soc.*, 90:862 (1968), and Hawthorne et al., "Pi-Dicarbollyl Derivatives of the Transition Metals. Metallocene Analogs," *J. Amer. Chem. Soc.*, 90:879 (1968), and Ruhle et al., *Inorg. Chem.*, 7:2279 (1968).

d. Halogenated, Metal 1,7-Dicarbollide Complexes

Transition metal 1,7-dicarbollide complexes and their derivatives can be chlorinated or brominated by elemental halogen in polar solvents. Substitution proceeds in the unsubstituted complex alternatively in both cages yielding successively 9-; 9,9'-; 9,9',10-; and 9,9',10,10'-halogen derivatives. The degree of halogenation is controlled by the reagent stoichiometry and reaction conditions.

2. Substituted Metal Dicarbollide Ions of the Formula: $M(B_9C_2H_{10-a}R_{a+1})_2^-$; R is Bound to Boron a. Non-halogenated 1,2-Complexes Substituted at the 6 Position The general synthetic scheme entails reacting unsubstituted 1,2-dicarbollide ion $(1,2-B_9C_2H_{11}^{-2})$ with an R-substituted boron dichloride $(RBCl_2)$ to form a 3-R-substituted ortho-carborane (more precisely, a 3-R-1,2-dicarba-closo-dodecaborane, $B_{10}C_2H_{11}R$). See, for example, M. Hawthorne and P. Wegner, "The Reconstruction of the 1,2-Dicarbaclovododecaborane(12) Structure by Boron-Atom Insertion with 1,2-Dicarbollide Ions", *J. Amer. Chem. Soc.*, 90:896 (1968), which is incorporated by reference herein.

Reaction of the 3-R-substituted ortho-carborane with methanolic base yields an R-substituted 1,2-dicarbadodecahydroundecaborate (−1)ion $(B_9C_2H_{11}R^-)$, which is substituted at the 6 position. Typically, the ion is isolated as a trimethylammonium salt, by, e.g., precipitation with trimethylammonium chloride.

The R-substituted 1,2-dicarbadodecahydroundecaborate (−1) ion is treated with sodium hydride in dry THF, forming an R-substituted dicarbollide ion $(B_9C_2H_{10}R^{-2})$, which is then reacted with an anhydrous metal halide in dry THF to form an R-substituted metal dicarbollide ion in which each dicarbollyl group carries an R group (instead of H) at the 6 position.

b. Non-Halogenated, 1,7-Dicarbollide Complexes Substituted at the 2 Position

The general synthetic scheme entails reacting unsubstituted 1,7-dicarbollide ion $(1,7-B_9C_2H_{11}^{-2})$ with an R substituted boron dichloride $(RBCl_2)$ to form 2-R-1,7-dicarba-closo-dodecaborane, $1,7-B_{10}C_2H_{11}R$. Reaction of the 2-R-substituted metacarbone with methanolic base yields R-substituted 1,7-dicarbadodecahydroundecaborate(−1) ion $(1,7-B_9C_2H_{11}R^-)$, which is substituted at the 2 position. Typically, the ion is isolated as the trimethylammonium salt by e.g., precipitation with trimethylammonium chloride. The trimethylammonium salt of 2-R-1,7-dicarbadodecahydroundecaborate(−1) ion is treated with sodium hydride in dry THF, forming R-substituted 1,7-dicarbollide ion $(1,7-B_9C_2H_{10}R^{-2})$, which is then reacted with an anhydrous metal halide in dry THF of form an R-substituted metal 1,7-dicarbollide complex in which each dicarbollyl group carries an R group (instead of H) at the 2 position. The entire schematic synthesis, beginning with 1,2-carborane or 1,7-carborane, is shown below, for cobalt:

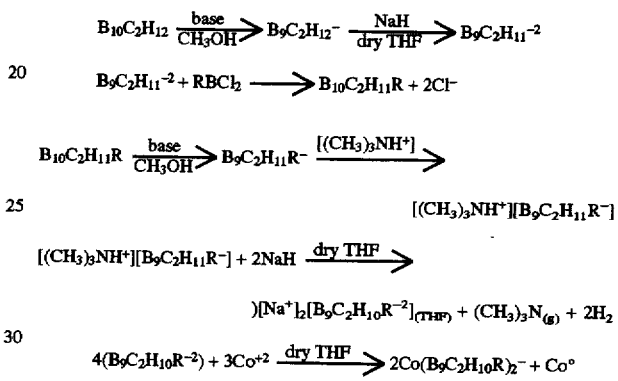

The substituted metal dicarbollide ion can be isolated as a salt or as the conjugate acid using the procedure(s) discussed above.

The synthesis of unsubstituted dicarbollide ion is well known, and entails degrading ortho-carborane with methanolic base, followed by reaction of the resulting 1,2-dicarbadodecahydroundecaborate (−1) ion $(B_9C_2H_{12}^-)$ with sodium hydride in anhydrous THF.

R-substituted boron dichlorides $(RBCl_2)$ can be prepared by reaction of boron trichloride with active R-substituted metals, such as Grignard reagents, R-substituted zinc or R-substituted tin compounds. As an illustrative example, $C_6H_5BCl_2$ may be obtained according to the following reaction:

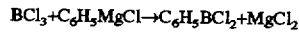

$BCl_3 + C_6H_5MgCl \rightarrow C_6H_5BCl_2 + MgCl_2$ c. Non-halogenated 1,2-Complexes Substituted at the 8 Position In general, bis(8-R-1,2-dicarbollyl) metal(III) ions (also called 8-R-substituted metal 1,2-dicarbollide ions) are easier to prepare than the 3-substituted isomers. The general reactive scheme entails reacting iodine $(I_2)$ with an unsubstituted metal 1,2-dicarbollide ion $[M(B_9C_2H_{11})_2^-]$ to form an 8-iodo-metal 1,2-dicarbollide ion $[M(8-I-1,2-B_9C_2H_{10})_2^-]$, followed by reaction with a Grignard reagent, $RMgX$ (X is Br, Cl or I) in the presence of a catalyst to form an 8-substituted metal 1,2-dicarbollide ion.

d. Non-Halogenated 1,7-Dicarbollide Complexes Substituted at the 9 Position

In general, bis(9-R-1,7-dicarbollyl) metal complexes are easier to prepare than the 2-substituted isomers. The general reactive scheme entails reacting iodine $(I_2)$ with unsubstituted 1,7-dicarbollide metal complex $M(1,7-B_9C_2H_{11})_2^-$ to form 9-iodo-metal dicarbollide ion $M(9-I-1,7-B_9C_2H_{10})_2^-$, followed by reaction with a Grignard reagent, RMgX (X is Br, Cl or I) in the presence of a catalyst to form 9-substituted metal 1,7-dicarbollide ion.

Illustrative reactions for both the 1,2- and 1,7-dicarbollide complexes may be represented as follows:

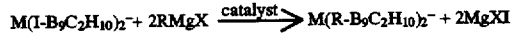

Alkyl and branched alkyl derivatives of bis-[(1,2-$B_9C_2H_{11}$)$_2$]M$^-$ in the 8,9,12,8',9',12' positions and bis-[(1,7-$B_9C_2H_{11}$)$_2$]M$^-$ in the 9,10,9', 10' positions can be prepared by Friedel-Crafts alkylation using, for example, alkyl halides with Lewis acid catalysts such as aluminum chloride. As a representative example, bis[(sec-$C_4H_9$)$_2$-dicarbollyl]cobalt(III) may be prepared according to the following reaction:

as is more fully described in Example 6.

The syntheses of several unsubstituted metal dicarbollide ions have been reported and are well known. See, e.g., Hawthorne et al., "Pi-Dicarbollyl Derivatives of the Transition Metals. Metallocene Analogs," *J. Amer. Chem. Soc.*, 90:879 (1968), and Ruhle et al., *Inorg. Chem.*, 7:2279 (1968), both of which are incorporated herein by this reference.

e. Halogenated 1,2-Dicarbollide Complexes Substituted at the 6 or 8 Position

Transition metal 1,2-dicarbollide complexes can be R-substituted in the 6 or 8 position as described above. Both types of substituted complex can be chlorinated or brominated by elemental halogen in polar solvents. In the 6-substituted complex, halogen substitution proceeds in both cages yielding successively 8-; 8,8'-; 8,9,8'-; 8,9,8',9'-; 8,9,12,8',9'- and 8,9,12,8',9',12'-halogen derivatives. In the 8-substituted complex, halogen substitution proceeds in both cages yielding successively 9,9'-; 9,12,9'- and 9,12,9',12'-halogen derivatives. In both cases, the degree of halogenation is controlled by the reagent stoichiometry and reaction conditions.

f. Halogenated 1,7-Dicarbollide Complexes Substituted at the 2 or 9 Positions

Transition metal 1,7-dicarbollide complexes and their derivatives can be chlorinated or brominated by elemental halogen in polar solvents. Halogenation proceeds in the complex substituted in the 2 position alternatively in both cages yielding successively 9-; 9,9'-; 9,9',10-; and 9,9',10,10'-halogen derivatives. Halogenation proceeds in the complex substituted in the 9 position alternatively in both cages yielding successively 10-; and 10,10'-halogen derivatives. The degree of halogenation is controlled by the reagent stoichiometry and reaction conditions.

3. Preparation of "Mixed" Substituted Metal Dicarbollide Ions of the Formula: $(B_9C_2H_{10-a}(R_1)_{a+1})M(B_9C_2H_{10-a}(R_2)_{a+1})$ The reaction scheme entails treating equimolar amounts of the trimethylammonium salts of R-substituted dicarbadodecahydroundecaborate (−1) and $R_2$-substituted dicarbadodecahydroundecaborate (−1) ions with excess sodium hydride to form a mixture of $R_1$- and $R_2$-substituted dicarbollide ions, and treatment of the mixture with an anhydrous metal halide in THF to form mixed complex ions. When $R_2$ is methyl (—$CH_3$), and the reactants and products are non-halogenated, the general reaction is:

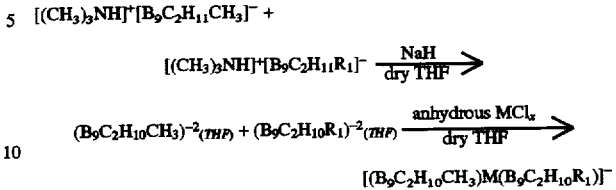

A similar scheme can be written out for $R_2$=trifluoromethyl (—$CF_3$).

The monoanions, $[B_9C_2H_{11}(R_1)]^-$ and $[B_9C_2H_{11}(R_2)]^-$, where $R_1$ and $R_2$ are as defined above, and their trimethylammonium salts, are prepared in accordance with the procedures described above.

Transition metal 1,2- and 1,7-dicarbollide complexes and their "mixed" derivatives can be chlorinated or brominated by elemental halogen in polar solvents. Halogenation process at the unsubstituted, lablie boron atoms in the sequences discussed above for the 1,2- and 1,7-dicarbollide complexes respectively. The degree of halogenation is controlled by the reagent stoichiometry and reaction conditions.

4. Preparation of Metal Dicarbollide Ion—Substituted Organosiloxanes

Siloxane substituted transition metal dicarbollide complexes are produced by classical silicon chemistry methods. For example, chlorosilanes (≡Si—Cl) react with hydroxyl groups (R—OH) to form ≡Si—O—R, hydrosilanes (≡Si—H) add to unsaturated hydrocarbons (R—CH=$CH_2$) to form ≡Si—$CH_2CH_2$—R and nucleophilic reagents (R$^-$) attack silicon-chlorine bonds (≡Si—Cl) to form ≡Si—R. Thus $Cs\{[8-(OH)-1,2-B_9C—_2H_{10}]_2Co\}$ reacts with Cl—Si$(CH_3)_2O$—$Si(CH_3)_2C_6H_5$ to produce $Cs\{[8-Si(CH_3)_2—C_6H_5—O—Si(CH_3)_2—O—1,2-B_9C_2H_{10}]_2Co\}$ and $Cs\{[1—CH_2=CHCH_2CH_2-1,2-B_9C_2H_{10}]Co[1-CH_3-1,2-B_9C_2H_{10}]\}$ reacts with H—$Si(CH_3)_2$—O—$[Si(CH_3)_2$—O—$]_n$—$Si(CH_3)_3$ to produce $Cs\{[1-Si(CH_3)_3$—O—$[Si(CH_3)_2$—O—$]_n$-$Si(CH_3)_2$—O—$CH_2CH_2CH_2CH_2-1,2-B_9C_2H_{10}]Co[1-CH_3-1,2-B_9C_2H_{10}]\}$. Finally, a transition metal dicarbollide complex can act as an acid and donate a proton from a cage carbon atom to strong bases such as lithium diisopropylamide (Aldrich, Inc.), butyl lithium or sodium hydride to produce a nucleophilic anion (e.g., $Cs[B_9C_2H_{11})Co(LiB_9C_2H_{10})]$). The nucleophilic anion can then attack the silicon-chlorine bond such as that in Cl—Si$(CH_3)_2$—O—$Si(CH_3)_2C_6H_5$ to produce $Cs\{(B_9C_2H_{11})CoB_9C_2H_{10}-[Si(CH_3)_2$—O—$Si(CH_3)_2C_6H_5]\}$.

5. Substituted Metal Dicarbaextrañide Ions of the Formula $M(B_{10}C_2H_{11-a'}R_{a'+1})_2^-$; R is Bound to Carbon a. Non-halogenated Metal bis($B_{10}C_2H_{12}$)$^-$ Complexes The general synthetic scheme entails reacting decaborane ($B_{10}H_{14}$) with a terminal alkyne (RCCH) in the presence of an electron donor molecule, such as acetonitrile or dialkyl sulfide (L) to form an R-substituted 1,2-carborane, (1-R-1,2-$B_{10}C_2H_{11}$). Treatment of the carborane with sodium metal in tetrahydrofuran in the presence of naphthalene yields 7-R-substituted dicarbadodecahydrododecaborate(−2) ion (7,9-$B_{10}C_2H_{11}R^{-2}$). (For example, 1-propyne yields ($B_{10}C_2H_{11}CH_3$)$^{-2}$; 3,3,3-trifluoro-1-propyne yields ($B_{10}C_2H_{11}$ $CF_3$)$^{-2}$; etc.

Reaction with a transition metal halide yields an R-substituted metal dicarbaextrañide $M(B_{10}C_2H_{11}R)^-$ (more precisely, a bis(R-substituted-7,9-dicarbaextrañyl) metal(III) (−1) ion, as a mixture of 7-R- and 9-R-substituted isomers.

Thus, the first two steps of the synthesis are:

$$B_{10}H_{14} + RCCH \xrightarrow{L} 1,2\text{-}B_{10}C_2H_{11}R + 2H_2 \quad (i)$$

and $$B_{10}C_2H_{11}R + 2Na \xrightarrow{\text{THF}}_{\text{Naphthalene}} Na_2(B_{10}C_2H_{11}R)$$

The metal dicarbaextrañide ion can be formed by reacting the R-substituted dicarbadodecahydrododecaborate(-2) ion with a metal halide. Thus, for cobalt, the reaction is $$4(7,9\text{-}B_{10}C_2H_{11}R^{-2}) + 3CoCl_2 \rightarrow 2[Co(7,9\text{-}B_{10}C_2H_{11}R)]^- + Co^0 + 6Cl^-$$

The substituted metal dicarbaextrañide ion can be isolated as a salt (for example, a cesium salt, by treatment with CsCl) and, if desired, can be convened to the conjugate acid, $[H^+][M(B_{10}C_2H_{11}R)_2^-]$, either by reaction with a strong mineral acid or by passage through a protonated ion exchange column.

b. Halogenated Complexes

Transition metal dicarbaextrañide ion complexes and their derivatives can be chlorinated or brominated by elemental halogen in polar solvents. Substitution proceeds in the unsubstituted complex yielding 1, 5, 6, 11, 1', 5', 6', 11'-halogen derivatives. The degree of halogenation is controlled by the reagent stoichiometry and reaction conditions.

6. Substituted Metal Dicarbaextrañide Ions of the Formula: $M(B_{10}C_2H_{11-a}R_{a+1})_2^-$; R is Bound to Boron a. Non-halogenated Metal Dicarbaextrañide Complexes Substituted at the 11 Position The general reactive scheme entails reacting iodine ($I_2$) with an unsubstituted metal dicarbaextrañide $[M(B_{10}C_2H_{12})_2]^-$ to form an $[M(B_{10}C_2H_{11}I)_2]^-$, followed by reaction with a Grignard reagent, RMgX (X is Br, Cl or I) in the presence of a catalyst to form an R-substituted metal dicarbaextrañide complex $[M(B_{10}C_2H_{11})_2]^-$.

Illustrative reactions for metal dicarbaextrañide complexes may be represented as follows:

$$[M(B_{10}C_2H_{12})_2]^- + 2I_2 \rightarrow [M(B_{10}C_2H_{11}I)_2]^- + 2HI$$

$$[M(B_{10}C_2H_{11}I)_2]^- + 2RMgX \rightarrow [M(B_{10}C_2H_{11}R)_2]^- + 2MgXI$$

b. Non-halogenated Metal Dicarbaextrañide Substituted at the 1, 5, 6 and 11 Positions Alkyl and branched alkyl derivatives of $[M(B_{10}C_2H_{12})_2]^-$ in the 1, 5, 6, 11, 1', 5',6',11' positions can be prepared by Friedel-Crafts alkylation using, for example, alkyl halides with Lewis acid catalysts such as aluminum chloride. As a representative example, bis[1,5,6,11-(sec-$C_4H_9$)$_4$-7,9-$(B_{10}C_2H_8)_2$]Co$^-$ may be prepared according to the following reaction.

$$(7,9\text{-}B_{10}C_2H_{12})_2Co^- + 8\text{-sec-ClC}_4H_9 \xrightarrow{AlCl_3}$$

$$[1,5,6,11\text{-(sec-}C_4H_9)_4\text{-}7,9\text{-}B_{10}C_2H_8)_2]Co^- + 8 HCl$$

c. Non-halogenated Metal Dicarbaextrañide Substituted at the 7 or 9 or 10 or 12 Position Substituted metal dicarbaextrañide complexes can be prepared from virtually any substituted carborane ($B_{10}C_2H_{11}R$) irrespective of whether the substituent is on carbon or boron in the original carborane. For example, complexes made from carborane containing an R-substituent on the boron atom in the 3-position (as described in section 2.a. above), after reduction with sodium metal and complexation with a transition metal, contain the R-substituent on the boron atoms in either the 10- or 12-positions of each cage of the resulting metal complex (positional differences are due to the fluxional behavior of the dicarbaextrañide ion in which positions 10- and 12- become equivalent). Similarly, complexes made from carborane ($B_{10}C_2H_{11}R$) bearing the substituent on a cage carbon atom (as described in section 1.a. above), contain the substituent on carbon atoms in either the 7- or 9-positions of each cage of the resulting complex.

d. Halogenated Metal Dicarbaextrañide Complexes

Transition metal dicarbaextrañide complexes and their derivatives can be chlorinated or brominated by elemental halogen in polar solvents. Substitution proceeds in the unsubstituted complex yielding 1, 5, 6, 11, 1', 5', 6', 11'-halogen derivatives. The degree of halogenation is controlled by the reagent stoichiometry and reaction conditions.

7. Preparation of Metal Dicarbaextrañide—Substituted Organosiloxanes

Siloxane substituted metal dicarbaextrañide complexes are produced by classical silicon chemistry methods. For example, chlorosilanes ($\equiv$Si—Cl) react with metalated cage carbon atoms ($C^-Li^+$) to form $\equiv$Si—C, hydrosilanes ($\equiv$Si—H) add to unsaturated hydrocarbons (R—CH=CH$_2$) to form $\equiv$Si—CH$_2$CH$_2$—R and nucleophilic reagents (R$^-$) attack silicon-chlorine bonds ($\equiv$Si—Cl) to form $\equiv$Si—R. Thus Cs{[7-CH$_2$=CHCH$_2$CH$_2$-7,9-$B_{10}C_2H_{11}$]Co[7-CH$_3$-7,9-$B_{10}C_2H_{11}$]} reacts with H—Si(CH$_3$)$_2$—O—]Si(CH$_3$)$_2$—O—]$_n$—Si(CH$_3$)$_3$ to produce Cs{[7-Si(CH$_3$)$_3$—O—[Si(CH$_3$)$_2$—CH$_2$CH$_2$CH$_2$CH$_2$-7,9-$B_{10}C_2H_{11}$]Co[7-CH$_3$-7,9-$B_{10}C_2H_{11}$]}. Finally, a metal dicarbaextrañide complex can act as an acid and donate a proton from a cage carbon atom to strong bases such as lithium diisopropylamide (Aldrich, Inc.), butyl lithium or sodium hydride to produce a nucleophilic anion (e.g., Cs[$(B_{10}C_2H_{12})$ Co(Li$B_{10}C_2H_{11}$)]). The nucleophilic anion can then attack the silicon-chlorine bond such as that in Cl—Si(CH$_3$)$_2$—O—Si(CH$_3$)$_2$C$_6$H$_5$ to produce Cs{$(B_{10}C_2H_{12})$ Co$B_{10}C_2H_{11}$—[Si(CH$_3$)$_2$—O—Si (CH$_3$)$_2$C$_6$H$_5$]}.

Extraction of Cesium and Strontium

In addition to the novel extraction agents described above, the present invention also provides new methods or processes for extracting cesium and strontium ions from aqueous solutions, such as aqueous fission product waste solutions. In one such process, cesium and/or strontium ions are extracted from an aqueous solution by passage through a unique, semipermeable membrane comprising either a modified silicone polymer containing pendant metal dicarbollide and/or dicarbaextrañide ion moieties, or a microporous polymer film impregnated with substituted metal dicarbollide and/or dicarbaextrañide ions. In another process, cesium and strontium are extracted by solvent extraction, using a nonaqueous phase in which are dissolved substituted metal dicarbollide and/or dicarbaextrañide ions of the type described above.

In both types of extraction processes, it is convenient to distinguish between "pregnant" and "stripped" phases. A "pregnant" phase or solution contains a substance, such as an ion, which is to be extracted. Thus, an aqueous solution containing cesium and/or strontium ions is referred to as a "pregnant phase" or "pregnant solution." After the ions are extracted into a nonaqueous phase, the aqueous solution is referred to as the "stripped phase"—ions have been stripped from it—and the nonaqueous phase (which now contains Cs$^+$ and/or Sr$^{+2}$ ions) is referred to as a "pregnant nonaqueous phase."

In one embodiment of the invention, schematically illustrated in FIG. 1, extraction proceeds without the use of a nonaqueous phase. An aqueous solution containing cesium (Cs$^+$) and strontium (Sr$^{+2}$) ions, such as an aqueous solution of fission product waste, is placed in the left compartment 11 of a cell 10. The right compartment 12 of the cell is charged with an aqueous solution of mineral acid, such as hydrochloric acid, nitric acid or sulfuric acid. The aqueous mineral acid solution preferably has a concentration of about 0.001M to about 3.0M, more preferably about 0.01M to about 2.0M, and most preferably about 0.05M to about 1.0M. The two compartments of the cell 10 are separated by a semipermeable membrane 13, which allows the passage of $Cs^+$, $Sr^{+2}$, and $H^+$ through the semipermeable membrane 13 between the two compartments 11 and 12.

In one embodiment, the semipermeable membrane comprises a thin, modified silicone elastomer containing metal dicarbollide and/or dicarbaextrañide ions chemically bound thereto. More particularly, the modified silicone elastomer is a metal dicarbollide and/or dicarbaextrañide ion-substituted organosiloxane as described above, with a molecular weight and organic groups (R', R") such that it is an elastomer, rather than an oil. In another embodiment, the membrane comprises a thin, microporous polymer film in which are immobilized protonated substituted metal dicarbollide and/or dicarbaextrañide ions of the type described above. Examples of such microporous films include Celgard 2500, sold by Celanese Plastics Co., and Accurel, sold by Enka Membrane. Both products are composed of polypropylene. Example 9, below, describes the impregnation of such a film with a protonated substituted metal dicarbollide ion prepared in accordance with the present invention.

According to this process, first $Cs^+$ ions and then $Sr^{+2}$ ions are extracted into the right compartment 12 containing mineral acid. Agitation, such as by a mechanical stirrer (not shown) causes the concentration of $Cs^+$ and $Sr^{+2}$ ions to be essentially constant throughout the left compartment 11 containing aqueous waste, and maximizes the number of $Cs^+$ and $Sr^{+2}$ ions impinging on (and diffusing through) the membrane per unit time.

Diffusion of cesium ions into and through the membrane is facilitated by association with the protonated metal dicarbollide and/or dicarbaextrañide ion complexes within the membrane, which simultaneously release hydrogen ions into the aqueous fission product solution. As the cesium ions pass from the membrane into the hydrochloric acid solution, they are replaced in the membrane by hydrogen ions from the hydrochloric acid solution. Thus, the net process is the passage of cesium ions from the fission product solution through the semipermeable membrane to the hydrochloric acid solution, and the passage of hydrogen ions from the hydrochloric acid solution through the membrane to the fission product solution.

Once equilibrium is achieved, the hydrochloric acid solution may be removed and evaporated to yield cesium chloride. The hydrochloric acid vapor that is produced can then be condensed and recycled. Recycled and/or fresh hydrochloric acid solution is then added to the right compartment of the cell and the process resumed. The process is repeated as many times as required to achieve the desired degree of extraction.

After most of the cesium ion has been extracted from the fission product solutions, strontium ion can be removed. A quantity of polyethylene glycol (such as PEG400) or p-nonylphenylnonaethylene glycol (such as Slovafol-909) is added to the aqueous fission product solution to facilitate the diffusion of strontium ions into the semipermeable membrane. Once in the membrane, the strontium ions diffuse through the membrane, facilitated by the metal dicarbollide and/or dicarbaextrañide ions contained therein, and into the hydrochloric acid solution in the right compartment of the cell. The strontium ions are replaced in the membrane by hydrogen ions from the hydrochloric acid solution. The net effect is the passage of strontium ions from the fission product solution through the semipermeable membrane to the hydrochloric acid solution, and the passage of hydrogen ions from the hydrochloric acid solution through the membrane to the fission product solution. Once equilibrium is achieved, the hydrochloric acid solution is removed and evaporated to isolate solid strontium chloride.

Figure 2:
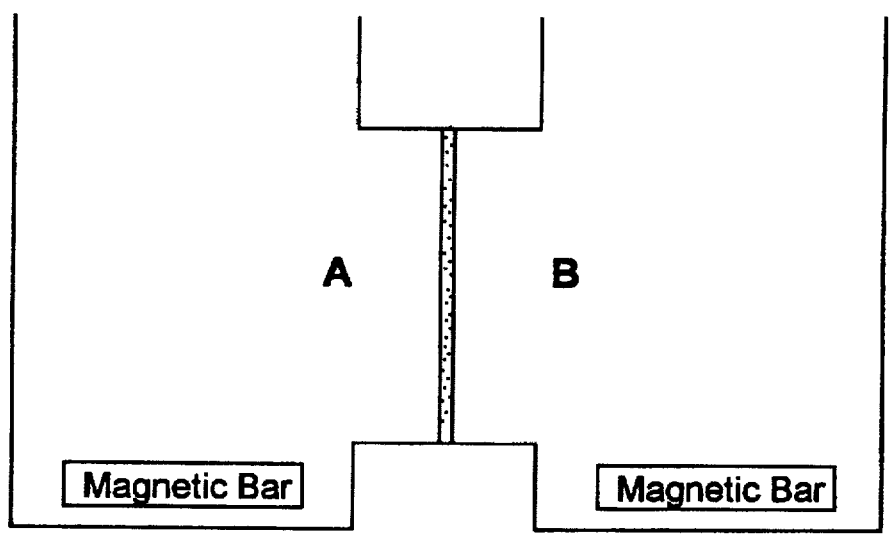
FIG. 2 is a schematic representation of an H-cell apparatus suitable for use in the invention having a metal dicarbollide-substituted or metal dicarbaextrañide substituted silicone oil immobilized on a polymer film.

Examples 14 and 23, below, describe another representative embodiment of the invention in which cesium ions are extracted from an aqueous solution using the conjugate acid of a metal dicarbollide and/or dicarbaextrañide ion-substituted silicone oil immobilized in an Accurel polypropylene film. The H cell is schematically illustrated in FIG. 2.

In yet another embodiment of the invention, extraction proceeds by a simple mixing and separation process similar to that encountered when a separatory funnel is used to extract a substance from an aqueous solution into a nonaqueous solution. In this embodiment, cesium ions are extracted from a pregnant aqueous phase into a nonaqueous phase containing at least one substituted metal dicarbollide or dicarbaextrañide ion extraction agent of the invention. For this purpose, the nonaqueous phase preferably contains a concentration of the extraction agent of from about 0.005M to about 0.50M, more preferably from about 0.007M to about 0.20M, and most preferably from about 0.010 to about 0.10M in a suitable solvent for the extraction agent. The choice of desireable solvents for use in the practice of the invention will depend on the particular extraction agent employed. For example, when the extraction agent is a alkyl- or phenyl-substituted metal dicarbollide or dicarbaextrañide ion, as described in detail above, representative solvents include hydrocarbon solvents such as, for example, kerosene and xylene, and 1-octanol, tributylphosphate, and similar hydrocarbon and phosphate solvents. When the extraction agent is a fluorinated alkyl- or phenyl-substituted metal dicarbollide or dicarbaextrañide ion of the invention, representative solvents include fluorinated alkanes and arenes such as fluorinated kerosene, fluorinated biphenyl compounds, fluorinated polyether compounds such as Fomblin Y vacuum pump oil (a perfluoro polyether available from Montedison USA, Inc., Aldrich), and other fluorinated hydrocarbon solvents. As used herein, the term "fluorinated hydrocarbon solvents" is intended to include any hydrocarbon solvent containing one or more fluorine substituents, e.g., mono-fluoro, difluoro, etc. up to perfluorinated hydrocarbons. When the extraction agent is an organosiloxane-substituted metal dicarbollide or dicarbaextrañide ion of the invention, representative solvents include silicone oils, such as the silicone oils PS 042 and PS 043 available from United Chemical Technologies, Inc., Bristol, Penn., USA, and other similar silicone oils.

The result is isolation of cesium ions from the other components (e.g., radionuclides) present in the original aqueous phase. Thereafter, the extracted cesium ions are readily stripped from the nonaqueous phase (which is considered "pregnant" with cesium ions) by treatment with a mineral acid, such as hydrochloric, nitric, or sulfuric acid, as described above. Strontium ions are then extracted from the original aqueous phase by first adding polyethylene glycol or p-nonylphenylnonaethylene glycol (which form a complex with $Sr^{+2}$ ions, rendering them more hydrophobic), and extracting the $Sr^{+2}$ from the aqueous phase to a nonaqueous phase. As with $Cs^+$, the $Sr^{+2}$ ions can then be stripped from the nonaqueous phase by treatment with a mineral acid.

Thus, cesium ions are conveniently extracted from an aqueous solution, or phase, by first forming an aqueous-nonaqueous liquid combination by contacting a pregnant aqueous phase containing cesium ions with a first nonaqueous phase containing a substituted metal dicarbollide and/or dicarbaextrañide extraction agent of the invention. The liquid combination is then separated into an aqueous phase which has a diminished cesium ion concentration and a pregnant nonaqueous phase which contains cesium ions extracted from the original, pregnant aqueous phase. Essentially, the interface between aqueous and nonaqueous phases in the liquid combination functions as a liquid membrane through which cesium ions pass. Although not bound by theory, it is believed that the substituted metal dicarbollide and dicarbaextrañide ions facilitate passage of cesium ions through the interface by forming neutral ion pairs with the cesium cations. After the cesium ions have been extracted into the nonaqueous phase, they can be stripped therefrom by treatment with mineral acid. Once extracted, the stripped cesium ions can be isolated as a cesium salt.

Strontium ions can be extracted from an aqueous solution in a similar manner. Preferably, the pregnant aqueous solution is substantially cesium-free, that is, most of the cesium originally present in the solution has already been removed by a prior extraction. Strontium is extracted by first adding polyethylene glycol or p-non-aphenylnonaethylene glycol to the pregnant aqueous phase. An aqueous-nonaqueous liquid combination is then formed by contacting the pregnant aqueous phase with a first nonaqueous phase containing substituted metal dicarbollide and/or dicarbaextrañide ions. The liquid combination is then separated into a stripped aqueous phase (which is diminished in strontium ion concentration) and a pregnant nonaqueous phase (which contains strontium ions extracted from the original pregnant aqueous phase). As was the case with cesium, strontium ions can then be stripped from the pregnant nonaqueous phase by treatment with mineral acid.

In practice, aqueous fission product waste solutions contain both cesium and strontium ions. Thus, the present invention provides extraction processes for selectively extracting both cesium and strontium ions, sequentially. More particularly, cesium and strontium ions are selectively extracted from an aqueous solution by (a) forming a first aqueous-nonaqueous liquid combination by contacting a pregnant aqueous phase containing cesium and strontium ions with a first nonaqueous phase containing substituted metal dicarbollide and/or dicarbaextrañide ions; (b) separating the first liquid combination into a stripped aqueous phase and a pregnant nonaqueous phase, wherein the pregnant nonaqueous phase contains cesium ions extracted from the pregnant aqueous phase; (c) modifying the stripped aqueous phase by adding a polyethylene glycol or p-nonaphenylnonaethylene glycol; (d)forming a second aqueous-nonaqueous liquid combination by contacting the modified, stripped aqueous phase with a fresh nonaqueous phase containing substituted metal dicarbollide and/or dicarbaextrañide ions; and (e) separating the second liquid combination into a second stripped aqueous phase and a second pregnant nonaqueous phase, wherein the second pregnant nonaqueous phase contains strontium ions extracted from the preceding aqueous phase.

Extraction efficiency can be increased by repeating each of the individual extraction steps, as may be desired. Thus, cesium ions are conveniently and efficiently extracted from an aqueous solution by alternately exposing a nonaqueous liquid containing substituted metal dicarbollide and/or dicarbaextrañide ions to (a) a pregnant aqueous solution containing cesium ions; and (b) an aqueous solution of mineral acid.

Similarly, strontium ions are more efficiently extracted from an aqueous solution by alternately exposing a nonaqueous liquid containing substituted metal dicarbollide and/or dicarbaextrañide ions to (a) a pregnant aqueous solution containing strontium ions and polyethylene glycol or p-nonaphenylnonaethylene glycol, and (b) an aqueous solution of mineral acid.

Figure 3:
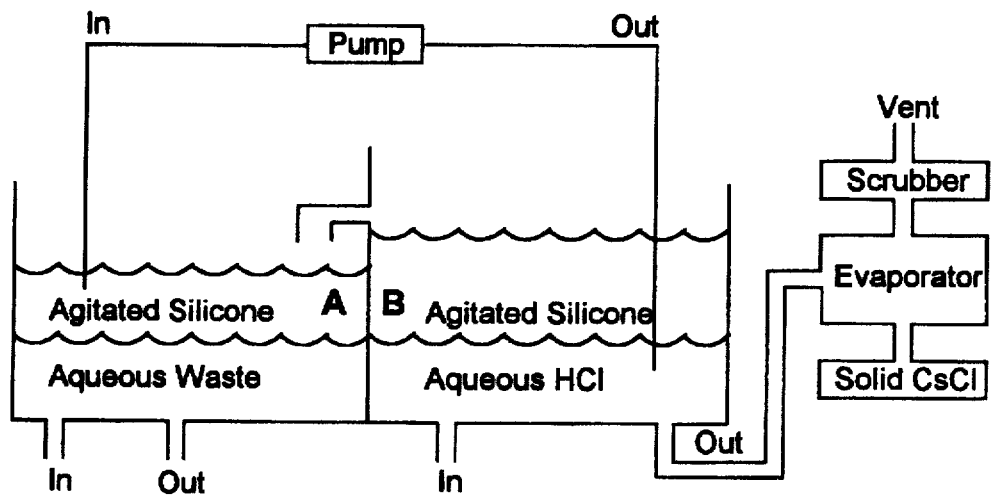
FIG. 3 is a schematic representation of a first embodiment of a continuous extraction process of the invention.
Figure 4:
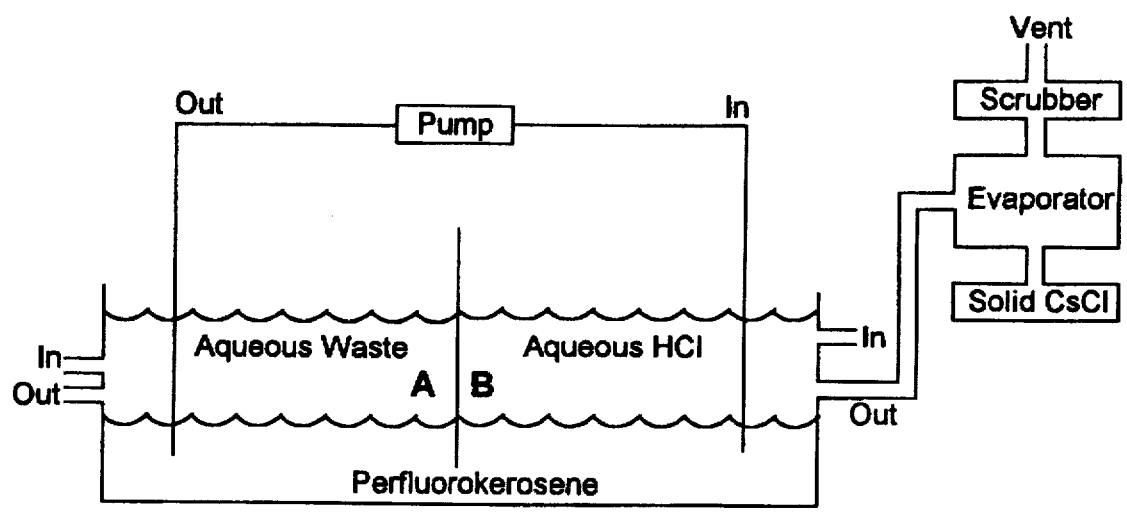
FIG. 4 is a schematic representation of a second embodiment of a continuous extraction process of the invention.

FIGS. 3 and 4 schematically illustrate a continuous process for selectively and efficiently extracting first cesium and then strontium from an aqueous solution (such as aqueous fission product waste). Thus, in FIG. 3 a nonaqueous liquid less dense than the aqueous waste solution and containing substituted metal dicarbollide and/or dicarbaextrañide ions is alternately exposed to an aqueous fission product solution in one compartment and an aqueous solution of mineral acid in another compartment.

A mechanical stirrer (not shown), or other agitation means, agitates the aqueous phase and increases the interaction between aqueous and nonaqueous phases. Cesium ions, facilitated by the substituted metal dicarbollide and/or dicarbaextrañide ions, diffuse into the nonaqueous phase. Simultaneously, hydrogen ions diffuse from the nonaqueous liquid into the fission product solution, thus maintaining electrical charge neutrality.

The nonaqueous liquid, laden with cesium ions, is mechanically transferred to another compartment containing hydrochloric acid. (Alternatively, another mineral acid can be used.) In FIG. 3, a pump is used to transfer the nonaqueous liquid between compartments. Alternatively, other means (not shown) may be used. Cesium ions diffuse from the nonaqueous liquid into the hydrochloric acid, with simultaneous diffusion of hydrogen ions from the hydrochloric acid to the nonaqueous liquid.

As the nonaqueous liquid is pumped from compartment (A) to compartment (B), the level of the nonaqueous liquid rises until it overflows from compartment to compartment (A). Thus, the system is continuous, with the net effect being transfer of cesium ions from compartment (A) to compartment (B) and transfer of hydrogen ions from compartment (B) to compartment (A). Periodically, hydrochloric acid solution is drained to an evaporator where the water and hydrogen chloride are removed, leaving solid cesium chloride.

After removal of most, or substantially most of the cesium, polyethylene glycol or p-nonaphenylnonaethylene glycol is added to the aqueous fission product solution in compartment (A) to facilitate the diffusion of strontium ion as a hydrophobic complex from the aqueous phase into the nonaqueous liquid. Diffusion of the strontium ion complex within the nonaqueous liquid is facilitated by the substituted metal dicarbollide and/or dicarbaextrañide ions contained therein. The nonaqueous liquid, laden with strontium ions, is mechanically transferred to compartment (B) containing stirred hydrochloric acid. Strontium ions diffuse from the nonaqueous liquid into the hydrochloric acid with simultaneous diffusion of hydrogen ions from the hydrochloric acid into the nonaqueous liquid.

As the nonaqueous liquid is pumped from compartment (A) to compartment (B), the level of the nonaqueous liquid rises until it overflows from compartment (B) to compartment (A). Thus, the system is continuous, with the net effect being transfer of strontium ions from compartment (A) to compartment (B) and transfer of hydrogen ions from compartment (B) to compartment (A). Periodically, hydrochloric acid solution is drained to an evaporator where the water and hydrogen chloride are removed, leaving solid strontium chloride.

FIG. 4 schematically illustrates an alternate embodiment of the invention in which a nonaqueous liquid more dense than the aqueous fission product solution and containing substituted metal dicarbollide and/or dicarbaextrañide ions is alternately exposed to aqueous fission product solution in compartment (A) then hydrochloric acid solution in compartment (B). (In FIG. 4, perfluorokerosene is shown as the denser, nonaqueous phase. Persons skilled in the art will appreciate that other solvents, having a density greater than the aqueous phase, can also be used.)

A mechanical stirrer (not shown), or other agitation means, agitates the nonaqueous phase and increases the interaction between aqueous and nonaqueous phases. Cesium ions diffuse into the nonaqueous phase, facilitated by the substituted metal dicarbollide and/or dicarbaextrañide ions contained therein. Simultaneously, hydrogen ions diffuse from the nonaqueous liquid into the fission product solution, thus maintaining electrical charge neutrality.

The dense, nonaqueous liquid, laden with cesium ions can pass from compartment (A) to compartment (B) where it contacts stirred hydrochloric acid. Cesium ions diffuse from the nonaqueous liquid into the hydrochloric acid with simultaneous diffusion of hydrogen ions from the hydrochloric acid to the nonaqueous liquid. Optionally, the nonaqueous liquid is mechanically pumped back from compartment (B) to compartment (A). (Alternatively, other transport means (not shown) can be used.) Thus, the system is continuous, with the net effect being transfer of cesium ions from compartment (A) to compartment (B), and transfer of hydrogen ions from compartment (B) to compartment (A). Hydrochloric acid solution is periodically drained to an evaporator where the water and hydrogen chloride are removed, leaving solid cesium chloride.

After removal of most, or substantially most of the $Cs^+$, polyethylene glycol or p-nonaphenylnonaethylene glycol is added to the aqueous fission product solution in compartment (A) to facilitate the diffusion of strontium ions into the denser, nonaqueous liquid. Diffusion of strontium ions within the nonaqueous liquid is facilitated by the substituted metal dicarbollide and/or dicarbaextrañide ions contained therein.

The nonaqueous liquid, laden with strontium ions, can pass from compartment (A) to compartment (B) containing stirred hydrochloric acid. Strontium ions diffuse from the dense, nonaqueous liquid into the hydrochloric acid with simultaneous diffusion of hydrogen ions from the hydrochloric acid into the dense nonaqueous liquid. Optionally, the dense, nonaqueous liquid is pumped or otherwise transferred from compartment (B) to compartment (A). Thus, the system is continuous, with the net effect being transfer of strontium ions from compartment (A) to compartment (B) and transfer of hydrogen ions from compartment (B) to compartment (A). Hydrochloric acid solution is periodically drained to an evaporator where the water and hydrogen chloride are removed leaving solid strontium chloride.

EXAMPLES

The following examples provide non-limiting illustrations of the extraction agents and processes of the present invention, as well as methods for making and/or using same.

1,2-Dicarbollide (−2) ion, bis[1,2-dicarbollyl]cobalt(III) (−1) (cobalt dicarbollide ion) and their 1,7-analogs may be prepared by known methods (see, e.g., *J. Amer. Chem. Soc.*, 90:879 (1968), cited above). Dicarbaextrañide and bis [dicarbaextrañlyl]metal(III) complexes may also be prepared by known methods (see, e.g., *J. AM. Chem. Soc.*, 93:2541 (1971) and *J. Am. Chem. Soc.*, 95:1109 (1972), cited above).

EXAMPLE 1

Trimethylammonium 1-(n-Octyl)-1,2-dicarbadodecahydroundecaborate

A 1000 mL, 3-necked, round-bottom flask fitted with a mechanical stirrer, reflux condenser topped with a nitrogen inlet, and a pressure equalized dropping funnel is charged with 60.0 g (0.49 mol) of decaborane and 450 mL of benzene. Acetonitrile (40.2 g, 0.98 mol) is added to the flask over a 30 minute period. The solution is heated to reflux and maintained for 23 hours. The reaction mixture is cooled slightly and 89.8 g (0.54 mol) of 1-decyne is placed into the dropping funnel. The reaction mixture is again heated to reflux and the 1-decyne is added to the flask over 5.3 hours, with reflux maintained an additional 15 hours. The mixture is cooled to ambient temperature, and the solvents are stripped using a rotary evaporator and a 60° C. water bath, leaving a viscous red-brown oil (167 g). The oil is dissolved in 280 mL of acetonitrile and extracted with 2600 mL of hexane for 18 hours. The hexane-carborane fraction is washed with 400 mL of cold water followed by four 500 mL portions of cold 10% NaOH and two 500 mL portions of water. The hexane-carborane fraction is dried over anhydrous $MgSO_4$ and filtered. The solvent is stripped using a rotary evaporator (mechanical pump) and a 60° C. water bath. The residual oil is heated at 240° C. for 6 hours under nitrogen, then distilled (0.5 mm Hg, 129° C.) with a flask temperature of 182°–188° C., to collect 46.1 g (0.18 mol, 36%) of 1-(n-$C_8H_{17}$)-1,2-$B_{10}C_2H_{11}$.

A 500 mL, three-necked flask equipped with a reflux condenser, mechanical stirrer and nitrogen inlet is charged with a solution of 20 g (0.36 mol, 100% excess) of potassium hydroxide in 300 mL of absolute ethanol. The solution is cooled to room temperature, and 46.1 g (0.18 mol) of 1-(n-$C_8H_{17}$)-1,2-$B_{10}C_2H_{11}$ is added. The resulting solution is stirred for 1 hour at room temperature then heated to reflux until hydrogen evolution ceases (about 2 hours). After cooling, an additional 100 mL of absolute ethanol is added. The excess potassium hydroxide is precipitated as potassium carbonate by saturating the solution with a stream of carbon dioxide. The precipitate is removed by filtration and washed with five 50 mL portions of ethanol. The combined filtrate and washings are evaporated to dryness to yield a crude potassium salt K[1-(n-$C_8H_{17}$)-1,2-$B_9C_2H_{11}$]. The salt is dissolved in 150 mL of water, and a solution of 22.0 g (0.23 mol) of trimethylammonium chloride in water (100 mL) is added. The precipitated trimethylammonium salt is isolated by filtration, washed with 50 mL of cold water, and dried in vacuo over phosphorus pentoxide to yield 51.9 g (0.17 mol, 94%) of [($CH_3$)$_3$NH][1-(n-$C_8H_{17}$)-1,2-$B_9C_2H_{11}$].

Alkyl and fluoro- to perfluoroalkyl dicarbollide ions containing 1–10 carbon atoms in the alkyl or fluorinated alkyl group are prepared by similar procedures beginning with the appropriate alkyne. See, e.g., Le Blanc et al., "The preparation of 1-hydroperfluorohexyne, octyne and decyne," *J. Fluorine Chem.*, 7(5):525–30 (1976), which is incorporated herein by reference.

EXAMPLE 2

Cesium Bis[1-(n-octyl)-1,2-dicarbollyl]cobalt(III)

A 4 L Erlenmeyer flask containing 51.9 g (0.17 mol) of [($CH_3$)$_3$NH][1-(n-$C_8H_{17}$)-1,2-$B_9C_2H_{11}$] and 1000 mL of water is cautiously treated with 1000 mL of hot, freshly prepared 40% aqueous sodium hydroxide and 66.5 g (0.28 mol) of $CoCl_2$.6 $H_2O$. The mixture is cooled, then extracted with ethyl ether; the organic phase is separated; and the solvent is removed in vacuo. The residue is taken up in 3 L of water and treated with 16.8 g (0.1 mol) of cesium chloride to give, on cooling, 46.3 g (0.07 mol, 80%) of $Cs\{[1\text{-}(n\text{-}C_8H_{17})\text{-}1,2\text{-}B_9C_2H_{10}]_2Co\}$.

EXAMPLE 3

Cesium Bis[6-(p-fluorophenyl)-1,2-dicarbollyl]cobalt(III)

3-(p-Fluorophenyl)-1,2-dicarba-closo-dodecaborane(12) is prepared by the procedure described by Adler and Hawthorne in "Determination of the Electronic Properties of Carboranes, Carborane Anions, and Metallocarboranes from Fluorine-19 Nuclear Magnetic Resonance Studies," *J. Amer. Chem. Soc.*, 92:6174 (1970), which is incorporated herein by reference. Degradation of 3-(p-fluorophenyl)-1,2-dicarbacloso-dodecaborane(12) to 6-(p-fluorophenyl)-1,2-dicarbadodecahydroundecaborate(−1) ion and subsequent conversion to bis[6-(p-fluorophenyl)-1,2-dicarbollyl]cobalt (III) ion is done using procedures developed for the non-fluorinated analogs. See M. Hawthorne and P. Wegner, "The Reconstruction of the 1,2-Dicarbaclovododecaborane(12) Structure by Boron-Atom Insertion with 1,2-Dicarbollide Ions", *J. Amer. Chem. Soc.*, 90:896 (1968), which is incorporated by reference herein.

Thus, a solution of 5.0 g (89 mmol) of potassium hydroxide in 75 mL of absolute ethanol is placed in a 300 mL three-necked flask equipped with a mechanical stiffer and a nitrogen inlet topped reflux condenser. A solution of 3-(p-fluorophenyl)-1,2-dicarba-closo-dodecaborane(12) (5.0 g, 21 mmol) in 50 mL of absolute ethanol is added to the flask, and the resulting solution is heated at the reflux temperature for 10 hours. The ethanol is removed using a rotary evaporator. The white solid residue is dissolved in the minimum mount of 6M hydrochloric acid and filtered through Celite. The Celite cake is washed with two 15 mL portions of water. The combined washings and filtrate are treated with a 50% solution of trimethylammonium chloride. The precipitate is separated by filtration and recrystallized from ethanol-water to yield 5.2 g (18 mmol, 86%) of $[(CH_3)_3NH][6\text{-}(p\text{-}FC_6H_4)\text{-}1,2\text{-}B_9C_2H_{11}]$.

A 500 mL, three-necked flask equipped with a nitrogen inlet topped reflux condenser, pressure equalized dropping funnel and a magnetic stirring bar is charged with sodium hydride (1.5 g of a 56% dispersion in mineral oil, 0.84 g, 35 mmol). The oil is removed by washing the sodium hydride with two 20 mL portions of dry tetrahydrofuran. Fresh tetrahydrofuran (50 mL) is added to the flask, and tetrahydrofuran (50 mL) containing $[(CH_3)_3NH][6\text{-}(p\text{-}FC_6H_4)\text{-}1,2\text{-}B_9C_2H_{11}]$(4.3 g, 15 mmol) is carefully added from the dropping funnel to the flask containing the sodium hydride slurry. After the addition is complete, the reaction mixture is heated at the reflux temperature for 3 hours. Trimethylamine is removed from the solvent by passing dry nitrogen over the solution and out through the condenser during the last 30 minutes of the reflux period. The mixture is then allowed to cool, and the excess sodium hydride is separated by filtration. The filtrate (containing 15 mmol of 6-(p-fluorophenyl)-1,2-dicarbollide ion) is treated with a tetrahydrofuran suspension of 1.6 g (12.0 mmol) of anhydrous cobalt chloride. The mixture is heated at the reflux temperature for 2 hours under nitrogen, cooled and filtered to remove the cobalt metal and sodium chloride formed. The solvent is evaporated and the residue dissolved in hot water. The solution is filtered and the yellow filtrate treated with excess cesium chloride. The precipitate is recrystallized from aqueous ethanol to yield 2.5 g (3.9 mmol, 52%) of $Cs\{[6\text{-}(p\text{-}FC_6H_4)\text{-}1,2\text{-}B_9C_2H_{10}]_2Co\}$.

EXAMPLE 4

Cesium Bis[8-(iodo)-1,2-dicarbollyl]cobalt(III), and Cesium Bis[8-(n-decyl)-1,2-dicarbollyl]cobalt(III)

A 500 mL flask equipped with a mechanical stirrer, a nitrogen inlet topped reflux condenser and a pressure equalized dropping funnel is charged with a solution of $K[(1,2\text{-}B_9C_2H_{11})_2Co]$(10.0 g, 28 mmol) in 100 mL of absolute ethanol. Under a very slow stream of nitrogen and with stirring, iodine (15.0 g, 59 mmol) dissolved in 50 mL of ethanol is added over 1 hour. The contents of the flask are stirred at room temperature for an additional 3 hours then heated at the reflux temperature for 2 hours. Excess iodine is reduced by addition of $Na_2SO_3 \cdot 7 H_2O$. The cooled mixture is filtered, then water (200 mL) is added and the contents of the flask stirred for 30 minutes. Excess aqueous cesium chloride is added and the mixture is cooled to 0° C. The precipitate is isolated by filtration then recrystallized from hot aqueous ethanol to yield 17.3 g (24 mmol, 89%) of $Cs\{[S\text{-}(I)\text{-}1,2\text{-}B_9C_2H_{10}]_2Co\}$.

A 500 mL flask equipped with a mechanical stirrer, a nitrogen inlet topped reflux condenser and a pressure equalized dropping funnel is charged with tetrahydrofuran (100 mL) and $Cs\{[8\text{-}(I)\text{-}1,2\text{-}B_9C_2H_{10}]_2Co\}$ (17.3 g, 24 mmol). Under a slow stream of nitrogen and with stirring, a solution of decylmagnesium bromide (100.0 mL, 1.0M, 100 mmol) is added over 1 hour. Catalytic amounts of $(Ph_3P)_2PdCl_2$ (250 mg) and CuI (75 mg) are added. The mixture is heated at the reflux temperature for 48 hours, cooled, then filtered. Water (2 mL) is added and the mixture stirred for 15 minutes, then the solvent is removed on a rotary evaporator. The semi-solid residue is dissolved in acetone, the mixture is filtered, and water is added. The precipitate is recrystallized from aqueous acetone to yield $Cs\{[8\text{-}(n\text{-}C_{10}H_{21})\text{-}1,2\text{-}B_9C_2H_{10}]_2Co\}$ (13.6 g, 19 mmol, 76%).

EXAMPLE 5

Cesium Bis[8-(hydroxy)-1,2-dicarbollyl]cobalt(III), and Cesium Bis[8-(tetramethylphenyldisiloxy)-1,2-dicarbollyl]cobalt(III)

Bis[8-(hydroxy)-1,2-dicarbollyl]cobalt(III) anion is prepared by the method described in J. Francis and M. Hawthorne, "Synthesis and Reactions of Novel Bridged Dicarbollide Complexes Having Electron-Deficient Carbon Atoms", *Inorg. Chem.*, 10:594 (1971), which is incorporated by reference herein. Thus, $K[(1,2\text{-}B_9C_2H_{11})_2Co]$ (30.6 g, 84 mmol) is dissolved in 300 mL of a 4:1 mixture of acetic acid-acetic anhydride 0.05N in $HClO_4$ and heated at 100° C. for 24 hours. The solution is cooled, the orange solid is collected, washed with acetic acid, and recrystallized from benzene-heptane to give golden yellow crystals of $K[(1,2\text{-}B_9C_2H_{10})_2CoO_2CCH_3]$ (22.2 g, 52.9 mmol, 63%). The $K[(1,2\text{-}B_9C_2H_{10})_2CoO_2CCH_3]$ is dissolved in 4:1 ethanol-water 0.1N in HCl and heated to reflux for 1 hour under nitrogen. Two volumes of water and one volume of saturated NaCl solution are added, and the product is precipitated with CsCl. The solid product is recrystallized from acetone-toluene and dried at 140° C. in vacuo to yield 25.8 g (52.8 mmol) of $Cs\{[8\text{-}(OH)\text{-}1,2\text{-}B_9C_2H_{10}]_2Co\}$.

A 500 mL three-neck flask fitted with a mechanical stirrer and a nitrogen inlet topped reflux condenser is cooled in an ice bath then charged with 20.0 g (41 mmol) of $Cs\{[8\text{-}(OH)\text{-}1,2\text{-}B_9C_2H_{10}]_2Co\}$ and 20.8 g (85 mmol) of chlorotetramethylphenyldisiloxane. The mixture is stirred under nitrogen for 1 hour, then the ice bath is removed and stirring continued while the mixture is warmed. Finally, the stirred mixture is heated to 50° C. until hydrogen chloride evolution ceases. Excess chlorotetramethylphenyldisiloxane is removed by subjecting the mixture to vacuum to yield (38.0 g, 42 mmol) of $Cs\{[1,2-B_9C_2H_{10}OSi(CH_3)_2OSi(CH_3)_2(C_6H_5)]_2Co\}$.

EXAMPLE 6

Cesium Bis[9,10-(sec-$C_4H_9$)$_2$-1,7-dicarbollyl]cobalt (III)

A 1000 mL flask equipped with mechanical stirring, thermocouple and a nitrogen inlet-topped reflux condenser is charged with 45.6 g (0.10 mol) of $Cs[bis-(1,7-B_9C_2H_{11})_2Co]$ and 450 g (515 mL, 4.7 mol) of sec-$ClC_4H_9$. Stirring is star and anhydrous aluminum chloride, 1.3 g (0.01 mol) is added. The mixture is stirred with sufficient cooling to maintain the temperature at near ambient for 3 hours. The mixture is filtered and excess 2-$C_1C_4H_9$ stripped using a rotary evaporator to yield $Cs\{[9,10-(sec-C_4H_9)_2-1,7-B_9C_2H_7]_2Co\}$ (63.3 g, 0.07 mol) as a viscous oil.

EXAMPLE 7

Cesium 1-$CH_2CHCH_2CH_2$-1,2-$B_9C_2H_{11}$, Cesium $\{[1-CH_2CHCH_2CH_2-1,2-B_9C_2H_{10}]Co[1,2-B_9C_2H_{10}]\}$, and Cesium $\{[1-CH_2CHCH_2CH_2-1,2-B_9C_2H_{10}]Co[1-CH_3-1,2-B_9C_2H_{10}]\}$ Substituted Silicone Oil The preparation of 1-$CH_2$-1,2-$B_{10}C_2H_{11}$-1-$BrCH_2$-$B_{10}C_2H_1$], and the Grignard reagent (1-$BrMgCH_2$-$B_{10}C_2H_{11}$) are accomplished by the methods described in Hawthorne et al., "Icosahedral Carboranes and Intermediates Leading to the Preparation of Carbametallic Boron Hydride Derivatives", *Inorganic Synthesis*, 10:91 (1967), which is incorporated by reference herein. The Grignard reagent in ethyl ether solution is treated with allyl bromide ($CH_2CHCH_2Br$) to yield 1-$CH_2CHCH_2CH_2$-1,2-$B_{10}C_2H_{11}$ using an adaptation of the literature method. The degradation of 1-$CH_3$-1,2-$B_{10}C_2H_{11}$ and 1-$CH_2CHCH_2CH_2$-1,2-$B_{10}C_2H_{11}$ to 1-$CH_3$-1,2-$B_9C_2H_{11}^-$ ion and 1-$CH_2CHCH_2CH_2$-1,2-$B_9C_2H_{11}^-$ ion respectively is accomplished by the methods described in Hawthorne eta., "Pi-Dicarbollyl Derivatives of the Transition Metals. Metallocene Analogs", *J. Amer. Chem. Soc.*, 90:879 (1968), the disclosure of which is incorporated by reference herein.

A solution of $[(CH_3)_3NH][1-CH_2CHCH_2CH_2-1,2-B_9C_2H_{11}]$ (9.89 g, 40 mmol) and $[(CH_3)_3NH][1-CH_3-1,2-B_9C_2H_{11}]$ (8.29 g, 40 mmol) in tetrahydrofuran (300 mL) is treated with excess NaH (7.56 g, 170 mmol, 54% in mineral oil), then filtered under nitrogen. The resulting solution of $Na[1-CH_2CHCH_2CH_2-1,2-B_9C_2H_{10}]$ and $Na[1-CH_3-1,2-B_9C_2H_{10}]$ is added to a slurry of anhydrous cobalt chloride (8.44 g, 65 mmol) in tetrahydrofuran. The mixture is heated to the reflux temperature and maintained for 2 hours, then cooled and filtered. The solvent is evaporated using a rotary evaporator. The solid is extracted with hot water, then filtered. Excess cesium chloride is added and the precipitate is dissolved in boiling acetone, filtered, and sufficient water is added to just initiate cloudiness. The solution is allowed to cool, during which time crystals of $Cs\{[1-CH_2CHCH_2CH_2-1,2-B_9C_2H_{10}][Co(III)][1-CH_3-1,2-B_9C_2H_{10}]\}$ from (9.38 g, 17.9 mmol, 44.8%).

A 500 mL flask equipped with a mechanical stirrer is charged with polydimethylsiloxane containing terminal SiH groups, H—$Si(CH_3)_2$—O—$[Si(CH_3)_2$—O$]_n$—Si ($CH_2$)-H (140 g, 8 mmol, n≈234) (available from United Chemical Technologies, Inc., Bristol, Penn.). The flask is heated to 40° C. with stirring then 8.39 g (16 mmol) of Cs $\{[1-CH_2CHCH_2CH_2-1,2-B_9C_2H_{10}][Co(III)][1-CH_3-1,2-B_9C_2H_{10}]\}$ and a platinum catalyst (chloroplatinic acid) are added in small portions over 1 hour. The mixture is heated and stirred at 90° C. for 2 hours. The resultant silicone, $Cs\{[1-CH_3-1,2-B_9C_2H_{10}][Co(III)][1-CH_2CH_2CH_2CH_2-1,2-B_9C_2H_{10}]$—$Si(CH_3)_2$—O—$]Si(CH_3)_2$—O$]_n$—$Si(CH_3)_2$-$Cs\{[1-CH_2CH_2CH_2CH_2-1,2-B_9C_2H_{10}][Co(III)][1-CH_3-1,2-B_9C_2H_{10}]\}$ (n≈234), end-capped with transition metal dicarbollide ion moieties, is isolated. Depending on the value of n and the composition of the silicone used, the polymer resulting from such reactions is a liquid (oil) or an elastomer.

EXAMPLE 8

Cesium [8-Iodo-1,2-dicarbollyl]Co[1,2-dicarbollyl], Cesium [8-vinyl-1,2-dicarbollyl]Co[1,2-dicarbollyl], and Cesium Bis[1,2-dicarbollyl]cobalt(III) Substituted Silicone Oil A 500 mL flask equipped with a mechanical stirrer, a nitrogen inlet topped reflux condenser and a pressure equalized dropping funnel is charged with a solution of $K[(1,2-B_9C_2H_{11})_2Co]$ (10.0 g, 28 mmol) in 100 mL of absolute ethanol. The solution is cooled to 0° C. Under a very slow stream of nitrogen and with stirring, iodine (6.9 g, 27 mmol) dissolved in 20 mL of ethanol is added over 1 hour. The flask is allowed to warm to ambient temperature over 3 hours and then stirred at room temperature for an additional 3 hours. The mixture is filtered, then water (200 mL) is added and the contents of the flask stirred for 30 minutes. Excess aqueous cesium chloride is added and the mixture is cooled to 0° C. The precipitate is isolated by filtration then recrystallized from hot aqueous ethanol to yield 14.5 g (25 mmol, 89%) of $Cs[(8-(I)-1,2-B_9C_2H_{10})Co(1,2-B_9C_2H_{11})]$.

A 500 mL flask equipped with a mechanical stirrer, a nitrogen inlet topped reflux condenser and a pressure equalized dropping funnel is charged with tetrahydrofuran (100 mL) and $Cs[(8-(I)-1,2-B_9C_2H_{10})Co(1,2-B_9C_2H_{11})]$ (14.5 g, 25 mmol). Under a slow stream of nitrogen and with stirring, a solution of vinylmagnesium bromide (50.0 mL, 1.0M, 50 mmol) is added over 1 hour. Catalytic mounts of $(Ph_3P)_2PdCl_2$ (250 mg) and CuI (75 mg) are added. The mixture is heated at the reflux temperature for 48 hours, cooled then filtered. Water (1 mL) is added and the mixture stirred for 15 minutes, then the solvent is removed on a rotary evaporator. The semi-solid residue is dissolved in acetone, the mixture filtered, and water is added. The precipitate is recrystallized from aqueous acetone to yield $Cs\{[8-(C_2H_3)-1,2-B_9C_2H_{10}]Co[1,2-B_9C_2H_{11}]\}$ (9.1 g, 19 mmol, 76%).

A 500 mL flask equipped with a mechanical stirrer is charged with a polydimethylsiloxane containing SiH groups, $Si(CH_3)_3$—O—$[Si(CH_3)_2$—O—$SiH(CH_3)$—O—$Si(CH_3)_2$—O$]_4$-$Si(CH_3)_3$ (4.0 g, 4 mmol). The flask is heated to 40° C. with stirring then 7.7 g(16 mmol) of $Cs\{[8-(C_2H_3)-1,2-B_9C_2H_{10}]Co[1,2-B_9C_2H_{11}]\}$ and a platinum catalyst (chloroplatinic acid) are added in small portions over 1 hour. The mixture is heated and stirred at 90° C. for 2 hours. The resulting silicone, $Si(CH_3)_3$—O—$[Si(CH_3)_2$—O—$Si\{Cs[(-8-C_2H_4-1,2-B_9C_2H_{10})Co(1,2-B_9C_2H_{11})]\}(CH_3)$—O—$Si(CH_3)_2$—O$]_4$-$Si(CH_3)_3$ containing transition metal dicarbollide ion moieties, is isolated. Depending on the molecular weight and composition of the silicone used, the polymer resulting from such reactions is a liquid or an elastomer.

EXAMPLE 9

Immobilization of the Liquid Membrane in a Support Polymer

A round bottom flask is charged with a solution of cesium bis[1,2-dicarbollyl]cobalt(III) anion substituted silicone oil (from Example 8) in o-dichlorobenzene. A microporous support polymer (Accurel polypropylene film) is placed in the flask, which is then cooled to 0° C. and evacuated. The flask is closed (under vacuum) and allowed to warm to ambient temperature. After standing for 1 hour, the support polymer is removed from the solution and exposed to vacuum to remove solvent, leaving the pores of the polymeric support filled with bis[1,2-dicarbollyl]cobalt(III) anion substituted silicone.

EXAMPLE 10

Extraction of $Cs^+$ From Aqueous Solution Using the Conjugate Acid of Bis[1-(n-octyl)-1,2-dicarbollyl]cobalt (III) Anion in Xylene The hydrogen form (conjugate acid) of $[1-(n-C_8H_{17})-1,2-B_9C_2H_{10}]_2Co^-$ may be obtained from the cesium salt by use of an ion-exchange resin or by treatment with aqueous acid followed by extraction with organic solvent. Thus, in a 1000 mL separatory funnel, a slurry of $Cs\{[1-(n-C_8H_{17})-1,2-B_9C_2H_{10}]_2Co\}$ (from Example 2) (4.08 g, 6.0 mmol) in 300 g of 3M $HNO_3$ is extracted with 300 g of xylene. The organic layer is separated and washed with 300 g of fresh 3M $HNO_3$ solution. The resulting xylene solution of $H\{[1-(n-C_8H_{17})-1,2-B_9C_2H_{10}]_2Co\}$ is added to a 1000 mL flask equipped with a magnetic stirring bar. An aqueous solution (300 mL), 3M in nitric acid and containing 0.58 g (3.0 mmol) of cesium nitrate, is added to the flask ($\approx$0.01M in $Cs^+$, the approximate concentration found in actual nuclear waste). The flask is heated to and maintained at 55° C. with stirring for 1 hour. Stirring is stopped, the organic layer separated and treated with 300 g of 3M nitric acid at 55° C., with stirring for 1 hour. The aqueous phase is separated and shown to contain about 2.5 mmol of cesium by atomic emission spectroscopy.

EXAMPLE 11

Extraction of $Cs^+$ From Aqueous Solution Using the Conjugate Acid of Bis[8-(tetramethylphenyldisiloxy)-1,2-dicarbollyl]cobalt (III) Anion in Silicone Oil A 1000 mL flask equipped with a magnetic stirring bar is charged with 5.4 g (6.0 mmol) of $Cs\{[B_9C_2H_{10}OSi(CH_3)_2OSi(CH_3)_2(C_6H_5)]_2Co\}$ (from Example 5) and 300 g of silicone oil (Dow-Corning 704). A solution 3M in nitric acid is added and the flask heated to 55° C. with stirring. After 1 hour, the silicone oil phase is separated and washed with 300 g of 3M nitric acid solution. The silicone oil phase is separated and treated with 300 mL of an aqueous solution, 3M in nitric acid and containing 0.58 g (3.0 mmol) of cesium nitrate at 55° C., with stirring for 1 hour. The aqueous phase is separated and the silicone oil phase is treated with 300 g of 3M nitric acid at 55° C., with stirring for 1 hour. The aqueous phase is separated and shown to contain about 2.4 mmol of cesium by atomic emission spectroscopy.

EXAMPLE 12

Extraction of $Cs^+$ From Aqueous Solution Using the Conjugate Acid of Bis[1,2-dicarbollyl]cobalt (III) Anion Substituted Polydimethylsiloxane A 1000 mL flask equipped with a magnetic stirring bar is charged with 4.40 g (1.5 mmol, 4 meq of transition metal dicarbollide complex per mmol of silicone) of bis[1,2-dicarbollyl]cobalt(III) anion substituted silicone oil (from Example 8). A 3M in nitric acid solution (300 g) is added and the flask heated to 55° C. with stirring. After 1 hour the siloxane-dicarbollide oil phase is separated and washed with 300 g of 3M nitric acid solution. The siloxane-dicarbollide oil phase is separated and treated with 300 g of an aqueous solution, 3M in nitric acid and containing 0.58 g (3.0 mmol) of cesium nitrate, at 55° C. with stirring for 1 hour. The aqueous phase is separated and the siloxane-dicarbollide oil phase is treated with 300 g of 3M nitric acid with stirring at 55° C. for 1 hour. The aqueous phase is separated and shown to contain about 2.1 mmol of cesium by atomic emission spectroscopy.

EXAMPLE 13

Extraction of $Sr^{+2}$ From Aqueous Solution Using the Conjugate Acid of Bis[1,2-dicarbollyl]cobalt (III) Anion Substituted Polydimethylsiloxane With PEG-400 Additive A 1000 mL flask equipped with a magnetic stirring bar is charged with 4.40 g (1.5 mmol) of bis[1,2-dicarbollyl]cobalt (III) anion substituted silicone oil (from Example 8). A solution 3M in nitric acid is added and the flask heated to 55° C. with stirring. After 1 hour the siloxane-dicarbollide oil phase is separated and washed with 300 g of 3M nitric acid solution. The siloxane-dicarbollide oil phase is separated and treated with an aqueous solution, 3M in nitric acid, containing 4.00 g, 10.0 mmol of PEG-400 and 0.63 g (3.0 mmol) of strontium nitrate at 55° C. with stirring for 1 hour. The aqueous phase is separated and the siloxane-dicarbollide oil phase is treated with 300 g of 3M nitric acid with stirring at 55° C. for 1 hour. The aqueous phase is separated and contains about 2.3 mmol of strontium.

EXAMPLE 14

Extraction of $Cs^+$ From Aqueous Solution Using the Conjugate Acid of Bis[1,2-dicarbollyl]cobalt (III) Anion Substituted Silicone Oil Immobilized in Polypropylene Film The two compartments of an H-cell are each equipped with a magnetic stirring bar and are separated by an Accurel film (5.0 cm diameter) containing immobilized bis[1,2-dicarbollyl]cobalt(III) anion substituted silicone oil (from Example 9). Both compartments are charged with a solution 3M in nitric acid to cover the membrane and the cell is heated to 55° C. with stirring. After 48 hours, the cell is emptied, and one compartment (A) is charged with 300 g of an aqueous solution, 3M in nitric acid and containing 0.58 g (3.0 mmol) of cesium nitrate. The other compartment (B) is charged with 300 g of 3M HCl. After 48 hours of stirring at 55° C., the solution in compartment (B) is collected and can be shown by atomic emission spectroscopy to contain about $7.2 \times 10^{-1}$ mmol of cesium.

EXAMPLE 15

Preparation of Sodium Dicarbaextrañide

A 1 L three-necked flask fired with a mechanical stirrer and a nitrogen inlet is charged with 1.15 g (50 mg-atoms) of sodium metal cut into small pieces, 3.6 g (25 mmol) of freshly sublimed 1,2-$B_{10}C_2H_{12}$, 150 mL of tetrahydrofuran (THF) and approximately 0.2 g of naphthalene. The flask is closed (slow nitrogen stream) and the contents stirred at room temperature until the sodium is consumed (about 3 hours). The sodium dicarbaextrañide ($Na_2B_{10}C_2H_{12}$) is then used in situ for the preparation of transition metal complexes.

EXAMPLE 16

Preparation of Cesium Bis[dicarbaextrañyl]cobalt (III)

To a solution of 12.5 mmol of $Na_2B_{10}C_2H_{12}$ prepared as in Example 15, is added 2.2 g (6.2 mmol) of solid cobalt(III) acetylacetonate. After stirring at room temperature for 12 hours, the mixture is filtered through Celite. The solvent is removed by rotary evaporation using a water aspirator. The resulting dark green oil is dissolved in a minimum quantity of ethyl alcohol and added to an ethyl alcohol solution of excess cesium chloride. The resulting precipitate is isolated by filtration, washed with water and redissolved in dichloromethane. Addition of hexane to the dichloromethane solution, followed by cooling to 0° C., results in the formation of 1.3 g (2.7 mmol, 44%) of dark green crystals of $Cs[(B_{10}C_2H_{12})_2Co^{III}]$. The green 7,9-isomer can be convened to the red 3,7-isomer and thence to the red 4,7-isomer by prolonged heating at about 100° C.

EXAMPLE 17

Preparation of Cesium Bis[1,5,6,11-Br$_4$-7,9-dicarbaextrañyl]cobalt(III)

A 1000 mL, three-necked flask fitted with a pressure equalized dropping funnel, mechanical stirring and a nitrogen inlet topped reflux condenser is charged with ethyl alcohol (250 mL) and $Cs[(B_{10}C_2H_{12})_2Co(III)]$ 1.3 g (2.7 mmol). The dropping funnel is charged with a solution of bromine (3.5 g, 21.6 mmol) in ethyl alcohol (50 mL). With a slow stream of nitrogen and stirring, the bromine solution is added to the flask over about 2 hours. The resulting mixture is heated at the reflux temperature for about 2 hours then cooled. The solvent is removed using a rotary evaporator and the resulting semi-solid is dissolved in dichloromethane (200 mL). The mixture is filtered and the filtrate is treated with hexane. After standing at 0° C. for several hours, large crystals form. The crystals are isolated by filtration and dried to yield 2.6 g (2.3 mmol, 86%) of $Cs[(1,5,6,11-Br_4-7,9-B_{10}C_2H_8)_2Co(III)]$.

EXAMPLE 18

Preparation of Cesium[11-($CH_2$=CH—)-7,9-dicarbaextrañyl]cobalt(III) (7,9-dicarbaextrañide)

A 500 mL flask equipped with a mechanical stirrer, a nitrogen inlet topped reflux condenser and a pressure equalized dropping funnel is charged with a solution of Cs[$(B_{10}C_2H_{12})_2Co(III)$] (4.8 g, 10 mmol) in 100 mL of absolute ethanol, and the solution is cooled to 0° C. Under a very slow stream of nitrogen and with stirring, iodine (2.5 g, 10 mmol) dissolved in 20 mL of ethanol is added over 1 hour. The flask is allowed to warm to ambient temperature over 3 hours and then stirred at room temperature for an additional 3 hours. The mixture is filtered then treated with hexane and cooled to 0° C. for several hours. The precipitate is isolated by filtration then recrystallized from hot ethanol/hexane to yield 5.1 g, 8.4 mmol, 84% of $Cs[(B_{10}C_2H_{11}I)Co(III)(B_{10}C_2H_{12})]$.

A 500 mL flask equipped with mechanical stirring, a nitrogen inlet topped reflux condenser and a pressure equalized dropping funnel is charged with tetrahydrofuran (100 mL) and $Cs[(B_{10}C_2H_{11}I)Co(III)(B_{10}C_2H_{12})]$ (5.1 g, 8.4 mmol). Under a slow stream of nitrogen and with stirring, a solution of vinylmagnesium bromide (10.0 mL, 1.0M, 10 mmol) is added over 1 hour. Catalytic amounts of $(Ph_3P)_2PdCl_2$ (250 mg) and CuI (75 mg) are added. The mixture is heated at the reflux temperature for 48 hours, cooled then filtered. Water (1 mL) is added and the mixture is stirred for 15 minutes. The solvent is then removed on a rotary evaporator. The semi-solid residue is dissolved in acetone, the mixture is filtered then water is added. The precipitate is recrystallized from aqueous acetone to yield Cs{[11-($CH_2$=CH—)-7,9-$B_{10}C_2H_{11}$]$Co^{III}$(7,9-$B_{10}C_2H_{12}$)} (3.2 g, 6.4 mmol, 76%).

Other Grignard reagents may be used to produce a variety of substituents at the 11 position of the cage. For example, decylmagnesium bromide may be used which yields Cs{[11-($C_{10}H_{21}$—)-7,9-$B_{10}C_2H_{11}$]$Co^{III}$(7,9-$B_{10}C_2H_{12}$)}.

EXAMPLE 19

Preparation of Cesium{[1 1-(pentamethyldisiloxy-$CH_2CH$—)-7,9-dicarbaextrañyl]cobalt(III) dicarbaextrañide}

A 500 mL flask equipped with mechanical stirring is charged with pentamethyldisiloxane containing a terminal SiH group, $Si(CH_3)_3$—O—$Si(CH_3)_2$—H (4.0 g, 27.0 mmol). The flask is heated to 40° C. with stirring then 13.7 g (27.0 mmol) of Cs{[11-($CH_2$=CH—)-7,9-$B_{10}C_2H_{11}$]Co(III)[7,9-$B_{10}C_2H_{12}$]} and a platinum catalyst (chloroplatinic acid) were added in small portions over 1 hour. The mixture is heated and stirred at 90° C. for 2 hours. The resultant silicone, Cs{[11-(pentamethyldisiloxy-$CH_2CH$—)-7,9-$B_{10}C_2H_{11}$]Co(III)[7,9-$B_{11}C_2H_{12}$]} containing transition metal dicarbollide ion moieties, is isolated. Depending on the molecular weight and composition of the silicone used, the polymer resulting from such reactions can be a liquid or an elastomer.

EXAMPLE 20

Preparation of Cesium Bis[7-(n-$C_8H_{17}$)-7,9-dicarbaextrañyl]cobalt(III)

1-(n-$C_8H_{17}$)-1,2-$B_{10}C_2H_{11}$ is prepared as in Example 1 above. A 1 L three-necked flask fitted with a mechanical stirrer and a nitrogen inlet is charged with 1.15 g (50 mg-atoms) of sodium metal cut into small pieces, 9.1 g (25 mmol) of 1-(n-$C_8H_{17}$)-1,2-$B_{10}C_2H_{11}$, 150 mL of tetrahydrofuran (THF) and approximately 0.2 g of naphthalene. The flask is closed (slow nitrogen stream) and the contents stirred at room temperature until the sodium is consumed (about 3 hours). The $Na_2[1-(n-C_8H_{17})-1,2-B_{10}C_2H_{11}]$ is then used in situ for the preparation of transition metal complexes.

To a solution of 12.5 mmol of $Na_2[1-(n-C_8H_{17})-1,2-B_{10}C_2H_{11}]$ is added 2.2 g (6.2 mmol) of solid cobalt(III) acetylacetonate. After stirring at room temperature for 12 hours, the mixture is filtered through Celite. The solvent is removed by rotary evaporation using a water aspirator. The resulting dark green oil is dissolved in a minimum quantity of ethyl alcohol and added to an ethyl alcohol solution of excess cesium chloride. The resulting precipitate is isolated by filtration, washed with water and redissolved in dichloromethane. Addition of hexane to the dichloromethane solution, followed by cooling to 0° C., results in the formation of 2.0 g (2.8 mmol, 44%) of dark green crystals of Cs{[7-(n-octyl)-7,9-$B_{10}C_2H_{11}$]$_2$Co(III)}.

EXAMPLE 21

Preparation of Cesium Bis[7-(n-perfluoroacyl)-7,9-dicarbaextrañyl]cobalt(III)

Alkyl and fluoro to perfluoroalkyl [(7,9-$B_{10}C_2H_{12}$)$_2$Co (III)]$^-$ ions containing 1–12 carbon atoms in the alkyl or fluorinated alkyl group can be prepared by similar procedures beginning with the appropriate alkyne. All of the alkyl and fluoro- to per-fluoroalkyl $[(7,9-B_{10}C_2H_{12})_2Co(III)]^-$ ions so prepared can be incorporated into bis-$(B_{10}C_2H_{12})$-metal complexes.

A 1000 mL, 3-necked, round-bottom flask fitted with a mechanical stirrer, reflux condenser topped with a nitrogen inlet and a pressure equalized dropping funnel is charged with 60.0 g (0.49 mol) of decaborane and 450 mL of benzene. Acetonitrile (40.2 g, 0.98 mol) is added to the flask over a 30 minute period. The solution is heated to reflux and maintained for 23 hours. The reaction mixture is cooled slightly and 239.8 g (0.54 mol) of 1-hydroperfluoro-1-decyne is placed into the dropping funnel. The reaction mixture is again heated to reflux and the 1-hydroperfluoro-1-decyne added to the flask over 5.3 hours, with reflux maintained an additional 15 hours. The mixture is cooled to ambient temperature and the solvents are stripped using a rotary evaporator and a 60° C. water bath leaving a viscous red-brown oil. The oil is dissolved in 500 mL of acetonitrile and extracted with 2600 mL of hexane for 18 hours. The hexane-carborane fraction is washed with 400 mL of cold water followed by four 500 mL portions of cold 10% NaOH and two 500 mL portions of water. The hexane-carborane fraction is dried over anhydrous $MgSO_4$ and filtered. The solvent is stripped using a rotary evaporator (mechanical pump) and a 60° C. water bath. The residual oil is heated at 240° C. for 6 hours under nitrogen then vacuum distilled to collect 83.0 g (0.15 mol, 30%) of 1-$(n-C_8F_{17})$-1,2-$B_{10}C_2H_{11}$.

A 1 L three-necked flask fitted with a mechanical stirrer and a nitrogen inlet is charged with 1.15 g (50 mg-atoms) of sodium metal cut into small pieces, 14.0 g (25 mmol) of 1-$(n-C_8F_{17})$-1,2-$B_{10}C_2H_{11}$, 150 mL of tetrahydrofuran (THF) and approximately 0.2 g of naphthalene. The flask is closed (slow nitrogen stream) and the contents stirred at room temperature until the sodium is consumed (about 3 hours). The $Na_2[1-(n-C_8F_{17})-1,2-B_{10}C_2H_{11}]$ is then used in situ for the preparation of transition metal complexes.

To a solution of 12.5 mmol of $Na_2[1-(n-C_8F_{17})-1,2-B_{10}C_2H_{11}]$ is added 2.2 g (6.2 mmol) of solid cobalt(III) acetylacetonate. After stirring at room temperature for 12 hours, the mixture is filtered through Celite. The solvent is removed by rotary evaporation using a water aspirator. The resulting dark green oil is dissolved in a minimum quantity of ethyl alcohol and added to an ethyl alcohol solution of excess cesium chloride. The resulting precipitate is isolated by filtration, washed with water and redissolved in dichloromethane. Addition of hexane to the dichloromethane solution, followed by cooling to 0° C., results in the formation of 3.2 g (2.4 mmol, 39%) of dark green crystals of $Cs\{[7-(n-C_8F_{17})-7,9-B_{10}C_2H_{11}]_2Co(III)\}$.

EXAMPLE 22

Extraction of $Cs^+$ From aqueous Solution Using the Conjugate Acid of Bis[7-(n-octyl)-7,9-dicarbaextrañyl]cobalt(III) Anion in Xylene The hydrogen form (conjugate acid) of $[7-(n-C_8H_{17})-7,9-B_{10}C_2H_{11}]_2Co^-$ may be obtained from the cesium salt by use of an ion-exchange resin or by treatment with aqueous acid followed by extraction with organic solvent. Thus, in a 1000 mL separatory funnel, a slurry of $Cs\{[7-(n-C_8H_{17})-7,9-B_{10}C_2H_{11}]_2Co\}$ (from Example 20) (4.2 g, 6.0 mmol) in 300 g of $3M HNO_3$ is extracted with 300 g of xylene. The organic layer is separated and washed with 300 g of fresh 3M $HNO_3$ solution. The resulting xylene solution of $H\{[1-(n-C_8H_{17})-1,2-B_{10}C_2H_{11}]_2Co\}$ is added to a 1000 mL flask equipped with a magnetic stirring bar. An aqueous solution (300 mL), 3M in nitric acid and containing 0.58 g (3.0 mmol) of cesium nitrate, is added to the flask ($\approx 0.01M$ in $Cs^+$, the approximate concentration found in actual nuclear waste). The flask is heated to and maintained at 55° C. with stirring for 1 hour. Stirring is stopped, the organic layer separated and treated with 300 g of 3M nitric acid at 55° C., with stirring for 1 hour. The aqueous phase is separated and can be shown to contain about 2.5 mmol of cesium by atomic emission spectroscopy.

EXAMPLE 23

Extraction of $Cs^+$ From Aqueous Solution using the Conjugate Acid of Bis[7,9-dicarbaextrañyl]cobalt (III) Anion Substituted Silicone Oil Immobilized in Polypropylene Film The two compartments of an H-cell are each equipped with a magnetic stirring bar and are separated by an Accurel film (5.0 cm diameter) containing immobilized bis[7,9-$B_{10}C_2H_{11}$]cobalt(III) anion substituted silicone oil (from Example 19). Both compartments are charged with a solution 3M in nitric acid to cover the membrane and the cell is heated to 55° C. with stirring. After 48 hours, the cell is emptied, and one compartment (A) is charged with 300 g of an aqueous solution, 3M in nitric acid and containing 0.58 g (3.0 mmol) of cesium nitrate. The other compartment (B) is charged with 300 g of 3M HCl. After 48 hours of stirring at 55° C., the solution in compartment (B) is collected and can be shown by atomic emission spectroscopy to contain about $7.1 \times 10^{-1}$ mmol of cesium.

What is claimed is:

1. A substituted dicarbaextrañide comprising a compound selected from the group consisting of:

a) metal dicarbaextrañide ion of the formula:

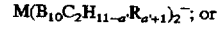

$M(B_{10}C_2H_{11-a}R_{a'+1})_2^-$; or b) a metal dicarbaextrañide ion-substituted organosiloxane of the formula:

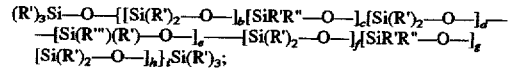

$(R')_3Si-O-\{[Si(R')_2-O-]_b[SiR'R''-O-]_c[Si(R')_2-O-]_d-$
$-[Si(R''')(R')-O-]_e-[Si(R')_2-O-]_fSiR'R''-O-]_g$
$[Si(R')_2-O-]_h\}_iSi(R')_3;$ wherein M is a transition metal capable of forming a trivalent oxidation state;

R' is methyl or trifluoromethyl;

R" is phenyl or fluoro-substituted phenyl;

R'" is a metal dicarbaextrañide ion moiety of the formula:

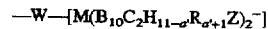

$-W-[M(B_{10}C_2H_{11-a}R_{a'+1}Z)_2^-]$ where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

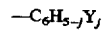

$-C_6H_{5-j}Y_j$ where j is 1 to 5, and Y is fluorine, phenyl or fluoro-substituted phenyl;

a' is 0 to 4; b, d, f, and h are 0 to 10; c and g are 0 or 1; and e and i are 1 to 10; and; each R is independently selected from $R_1$ and $R_2$, where $R_1$ is alkyl having from about 7 to about 10 carbon atoms; fluoro-substituted alkyl having from 2 to about 10 carbon atoms; substituted phenyl of the formula:

where j is 1 to 5, and Y is fluorine, phenyl or fluoro-substituted phenyl; or $R_1$ is an organosiloxane of the formula:

where
E is —Si(R')$_3$, —Si(R')$_2$(C$_6$H$_5$) or R''', k is 1 to 10, and R', R'', R''', b, c and d are as defined above; and
$R_2$ is selected from the group consisting of chlorine, bromine, methyl and trifluoromethyl;
provided that at least one R must be $R_1$.

2. A substituted metal dicarbaextrañide ion as recited in claim 1, wherein a' is 0 and R is alkyl having from 7 to 10 carbon atoms.

3. A substituted metal dicarbaextrañide ion as recited in claim 1, wherein R is fluoro-substituted alkyl having from 2 to about 10 carbon atoms.

4. A substituted metal dicarbaextrañide ion as recited in claim 1, wherein R is substituted phenyl selected from the group consisting of 1-o-fluorophenyl, biphenyl, phenylfluorophenyl and substituted phenyl of the formula:

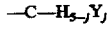

where j is 1 to 5, and Y is fluorine, phenyl or fluoro-substituted phenyl.

5. A substituted metal dicarbaextrañide ion as recited in claim 1, wherein R is an organosiloxane of the formula:

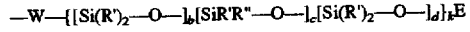

where E is —Si(R'$_3$, —Si(R'$_2$(C$_6$H$_5$) or R''', b is 0 to 10, c is 0 or 1, d is 0 to 10, k is 1 to 10, R' is methyl or trifluoromethyl, R'' is phenyl or fluoro-substituted phenyl, R''' is a metal dicarbaextrañide ion moiety of the formula:

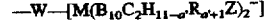

where a' is 0 to 4, W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

where j is 1 to 5, and Y is fluorine, phenyl or fluoro-substituted phenyl.

6. A metal dicarbaextrañide ion-substituted organosiloxane of claim 1 having the formula:

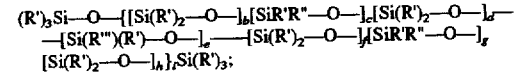

R' is methyl or trifluoromethyl;
R'' is phenyl or fluoro-substituted phenyl;

R''' is a metal dicarbaextrañide ion moiety of the formula:

wherein a' is 0 to 4; M is a transition metal capable of forming a trivalent oxidation state; W is oxygen or alkylene having from 2 to about 10 carbon atoms, and each Z is independently selected from hydrogen, alkyl having from 1 to about 10 carbon atoms; fluoro-substituted alkyl having from 1 to about 10 carbon atoms; phenyl or substituted phenyl of the formula:

where j is 1 to 5, and Y is fluorine, phenyl or fluoro-substituted phenyl; b, d, f, and h are 0 to 10; c and g are 0 or 1; and e and i are 1 to 10.

7. A substituted metal dicarbaextrañide ion as recited in claim 1, wherein M is selected from the group consisting of iron, cobalt and chromium.

8. A substituted metal dicarbaextrañide ion as recited in claim 7, wherein M is cobalt.

9. The conjugate acid of a substituted dicarbaextrañide, wherein the substituted dicarbaextrañide comprises:

a) a metal dicarbaextrañide ion of the formula:

or b) a metal dicarbaextrañide ion-substituted organosiloxane of the formula:

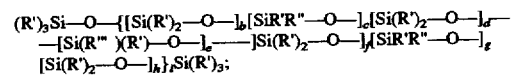

wherein
M is a transition metal capable of forming a trivalent oxidation state;
R' is methyl or trifluoromethyl;
R'' is phenyl or fluoro-substituted phenyl;
R''' is a metal dicarbaextrañide ion moiety of the formula:

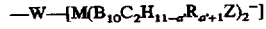

where W is oxygen or alkylene having from 2 to about 10 carbon atoms and each Z is independently selected from hydrogen, alkyl having from about 1 to about 10 carbon atoms; fluoro-substituted alkyl having from 1 to about 10 carbon atoms; phenyl or substituted phenyl of the formula:

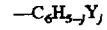

where j is 1 to 5 and Y is fluorine, phenyl or fluoro-substituted phenyl; a' is 0 to 4; b, d, f, and h are 0 to 10; c and are 0 or 1; and e and i are 1 to 10; and each R is independently selected from $R_1$ or $R_2$, where $R_1$ is alkyl from about 7 to about 10 carbon atoms; fluoro-substituted alkyl having from 2 to about 10 carbon atoms; substituted phenyl of the formula:

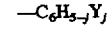

where j is 1 to 5, and Y is fluorine, phenyl or fluoro-substituted phenyl; or $R_1$ is an organosiloxane of the formula:

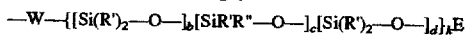

where

E is —Si(R')$_3$, —Si(R')$_2$(C$_6$H$_5$) or R'", k is 1 to 10, and R', R", R'", b, c and d are as defined above; and R$_2$ is selected from the group consisting of chlorine, bromine, methyl and trifluoromethyl, provided that at least one R must be R$_1$.

10. An extraction agent comprising a metal dicarbaextranide ion-substituted organosiloxane of the formula:

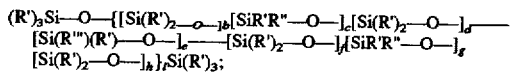

wherein

M is a transition metal capable of forming a trivalent oxidation state;

R' is methyl or trifluoromethyl;

R" is phenyl or fluoro-substituted phenyl;

R'" is a metal dicarbaextrañide ion moiety of the formula:

wherein

M is a transition metal capable of forming a trivalent oxidation state; W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from R$_1$ or R$_2$, where R$_1$ is alkyl having from about 7 to about 10 carbon atoms; fluoro-substituted alkyl having from 2 to about 10 carbon atoms; substituted phenyl of the formula:

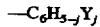

where j is 1 to 5, and Y is fluorine, phenyl or fluoro-substituted phenyl; or R$_1$ is an organosiloxane of the formula:

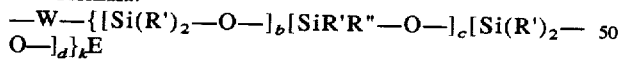

where

E is —Si(R')$_3$, —Si(R')$_2$(C$_6$H$_5$) or R'", k is 1 to 10, and R', R", R'", b, c and d are as defined above; and R$_2$ is selected from the group consisting of chlorine, bromine, methyl and trifluoromethyl;

provided that at least one R must be R$_1$.

11. An extraction agent as recited in claim 10, wherein the at least one metal dicarbaextrañide ion moiety contains a metal selected from the group consisting of iron, cobalt and chromium.

12. An extraction agent as recited in claim 11, wherein the at least one metal dicarbaextrañide ion moiety comprises cobalt.

13. An extraction agent as recited in claim 10, selected from the group consisting of [bis[1-(n-hexyl)-dicarbollyl] metal anion substituted silicone, bis[1-(n-heptyl)-dicarbollyl]metal anion substituted silicone, bis[1-(n-octyl)-dicarbollyl]metal anion substituted silicone, bis[1-(n-nonyl)-dicarbollyl]metal anion substituted silicone, bis[1-(n-decyl)-dicarbollyl]metal anion substituted silicone, and bis[1-(n-hexyl)-dicarbaextrañide]metal]bis[1-(n-hexyl)-dicarbaextrañyl]metal anion substituted silicone, bis[1-(n-hexyl)-dicarbaextrañyl]metal anion substituted silicone, bis[1-(n-octyl)-dicarbaextrañyl]metal anion substituted silicone, bis[1-(n-nonyl)-dicarbaextrañyl]metal anion substituted silicone, and bis[1-(n-decyl)-dicarbaextrañyl]metal anion substituted silicone.

14. A method for selectively extracting cesium ions from an aqueous phase, comprising:

forming an aqueous-nonaqueous liquid combination by contacting a pregnant aqueous phase containing cesium ions with a first nonaqueous phase comprising at least one extraction agent, wherein the extraction agent is a substituted metal dicarbaextrañide; and separating the liquid combination into a stripped aqueous phase and a pregnant nonaqueous phase, wherein the pregnant nonaqueous phase contains cesium ions extracted from the pregnant aqueous phase;

wherein the substituted dicarbaextrañide comprises:

a) a metal dicarbaextrañide ion of the formula:

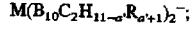

or b) a metal dicarbaextrañide ion-substituted organosiloxane of the formula:

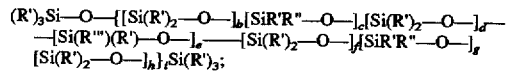

wherein

M is a transition metal capable of forming a trivalent oxidation state;

R' is methyl or trifluoromethyl;

R" is phenyl or fluoro-substituted phenyl;

R'" is a metal dicarbaextrañide ion moiety of the formula:

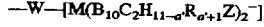

where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

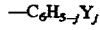

where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from R$_1$ or R$_2$, where R$_1$ is alkyl having from about 7 to about 10 carbon atoms; fluoro substituted alkyl having from 2 to about 10 carbon atoms; substituted phenyl of the formula:

where j is 1 to 5, and Y is fluorine, phenyl or fluoro-substituted phenyl; or R$_1$ is an organosiloxane of the formula:

$$-W-\{[Si(R')_2-O-]_b[SiR'R''-O-]_c[Si(R')_2-O-]_d\}_kE$$

where

E is $-Si(R')_3$, $-Si(R')_2(C_6H_5)$ or R''', k is 1 to 10, and R', R'', R''', b, c and d are as defined above; and $R_2$ is selected from the group consisting of chlorine, bromine, methyl and trifluoromethyl;

provided that at least one R must be $R_1$.

15. The method of claim 14 wherein the first nonaqueous phase comprises from about 0.005M to about 0.5M if the extraction agent.

16. The method of claim 14 wherein the extraction agent is an alkyl- or phenyl-substituted metal dicarbaextrañide ion and wherein the first nonaqueous phase further comprises a hydrocarbon solvent.

17. The method of claim 14 wherein the extraction agent is an alkyl- or phenyl-substituted metal dicarbaextrañide ion and wherein the first nonaqueous phase further comprises kerosene, xylene, 1-octanol, and tributylphosphate.

18. The method of claim 14 wherein the extraction agent is a fluorinated alkyl- or phenyl-substituted metal dicarbaextrañide and wherein the first nonaqueous phase further comprises a fluorinated hydrocarbon solvent.

19. The method of claim 18 wherein the fluorinated hydrocarbon solvent is fluorinated kerosene, a fluorinated biphenyl compound or a fluorinated polyether.

20. The method of claim 14 wherein the extraction agent is a an organo-siloxane-substituted metal dicarbaextrañide ion and wherein the first nonaqueous phase further comprises a silicone oil.

21. A method as recited in claim 14, which further comprises the step of stripping cesium ions from the pregnant nonaqueous phase.

22. A method as recited in claim 21, wherein the cesium ions are stripped from the pregnant nonaqueous phase by treatment with mineral acid.

23. A method for selectively extracting strontium ions from a substantially cesium-free aqueous solution, comprising:

adding a polyethylene glycol or p-nonylphenyl-nonaethylene glycol to a pregnant aqueous phase containing strontium ions;

forming an aqueous-nonaqueous liquid combination by contacting the pregnant aqueous phase with a first nonaqueous phase comprising at least one extraction agent, wherein the extraction agent is a substituted dicarbaextrañide; and separating the liquid combination into a stripped aqueous phase and a pregnant nonaqueous phase, wherein the pregnant nonaqueous phase contains strontium ions extracted from the pregnant aqueous phase;

wherein the substituted dicarbaextrañide comprises:

a) a metal dicarbaextrañide ion of the formula:

$$M(B_{10}C_2H_{11-a'}R_{a'+1})_2^-;$$

or b) a metal dicarbaextrañide ion-substituted organosiloxane of the formula:

$$(R')_3Si-O-\{[Si(R')_2-O-]_b[SiR'R''-O-]_c[Si(R')_2-O-]\}-$$
$$[Si(R''')(R')-O-]_e-[Si(R')_2-O-]_f[SiR'R''-O-]_g$$
$$[Si(R')_2-O-]_h\}_iSi(R')_3;$$

wherein

M is a transition metal capable of forming a trivalent oxidation state;

R' is methyl or trifluoromethyl;

R'' is phenyl or fluoro-substituted phenyl; R''' is a metal dicarbaextrañide ion moiety of the formula:

$$-W-[M(B_{10}C_2H_{11-a'}R_{a'+1}Z)_2^-]$$

where W is oxygen or alkylene having from 2 to about 10 carbon atoms; and each Z is independently selected from hydrogen, alkyl having from about 1 to about 10 carbon atoms; fluoro-substituted alkyl having from 1 to about 10 carbon atoms; phenyl or substituted phenyl of the formula:

$$-C_6H_{5-j}Y_j$$

where j is 1 to 5 and Y is fluorine, phenyl or fluoro-substituted phenyl; a' is 0 to 4, b, d, f, and h are 0 to 10; c and g are 0 or 1; and e and i are 1 to 10; and each R is independently selected from $R_1$ or $R_2$, where $R_1$ is alkyl from about 7 to about 10 carbon atoms; fluoro-substituted alkyl having from 2 to about 10 carbon atoms; substituted phenyl 1 of the formula:

$$-C_6H_{5-j}Y_j$$

where j is 1 to 5, and Y is fluorine, phenyl or fluoro-substituted phenyl; or $R_1$ is an organosiloxane of the formula:

$$-W-\{[Si(R')_2-O-]_b[SiR'R''-O-]_c[Si(R')_2-O-]_d\}_kE$$

where

E is $-Si(R')_3$, $-Si(R')_2(C_6H_5)$ or R''', k is 1 to 10 and R', R'', R''', b, c, and d are as defined above; and $R_2$ is selected from the group consisting of chlorine, bromine, methyl and trifluoromethyl;

provided that at least one R must be $R_1$.

24. The method of claim 23 wherein the first nonaqueous phase comprises from about 0.005M to about 0.5M of the extraction agent.

25. The method of claim 23 wherein the extraction agent is an alkyl- or phenyl-substituted metal dicarbaextrañide ion and wherein the first nonaqueous phase further comprises a hydrocarbons solvent.

26. The method of claim 23 wherein the extraction agent is an alkyl- or phenyl-substituted metal dicarbaextrañide ion and wherein the first nonaqueous phase further comprises kerosene, xylene, 1-octanol, and tributylphosphate.

27. The method of claim 23 wherein the extraction agent is a fluorinated alkyl- or phenyl-substituted metal dicarbaextrañide and wherein the first nonaqueous phase further comprises a fluorinated hydrocarbon solvent.

28. The method of claim 27 wherein the fluorinated hydrocarbon solvent is fluorinated kerosene, a fluorinated biphenyl compound or a fluorinated polyether.

29. The method of claim 23 wherein the extraction agent is an organosiloxane-substituted metal dicarbaextrañide ion and wherein the first nonaqueous phase further comprises a silicone oil.

30. A method as recited in claim 23, which further comprises the step of stripping strontium ions from the pregnant nonaqueous phase.

31. A method as recited in claim 30, wherein the strontium ions are stripped from the pregnant nonaqueous phase by treatment with mineral acid.

32. A method for selectively extracting cesium and strontium ions from an aqueous solution, comprising:

forming a first aqueous-nonaqueous liquid combination by contacting a pregnant aqueous phase containing cesium and strontium ions with a first nonaqueous phase comprising at least one extraction agent, wherein the extraction agent is a substituted dicarbaextrañide;

separating the first liquid combination into a stripped aqueous phase and a pregnant nonaqueous phase, wherein the pregnant nonaqueous phase contains cesium ions extracted from the pregnant aqueous phase;

modifying the stripped aqueous phase by adding a polyethylene glycol or p-nonylphenylnonaethylene glycol;

forming a second aqueous-nonaqueous liquid combination by contacting the modified, stripped aqueous phase with a fresh nonaqueous phase comprising at least one extraction agent, wherein the extraction agent is a substituted dicarbaextrañide; and separating the second liquid combination into a second stripped aqueous phase and a second pregnant nonaqueous phase, wherein the second pregnant nonaqueous phase contains strontium ions;

wherein the substituted dicarbaextrañide comprises:

a) a metal dicarbaextrañide ion of the formula:

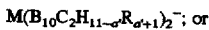

$M(B_{10}C_2H_{11-a'}R_{a'+1})_2^-$; or b) a metal dicarbaextrañide ion-substituted organosiloxane of the formula:

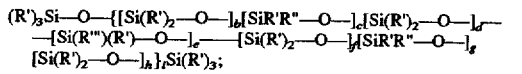

$(R')_3Si-O-\{[Si(R')_2-O-]_b[SiR'R''-O-]_c[Si(R')_2-O-]_d-$
$-[Si(R''')(R')-O-]_e-[Si(R')_2-O-]_f[SiR'R''-O-]_g$
$[Si(R')_2-O-]_h\}_iSi(R')_3$;

wherein

M is a transition metal capable of forming a trivalent oxidation state;

R' is methyl or trifluoromethyl;

R" is phenyl or fluoro-substituted phenyl;

R''' is a metal dicarbaextrañide ion moiety of the formula:

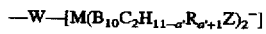

$-W-[M(B_{10}C_2H_{11-a'}R_{a'+1}Z)_2^-]$ where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

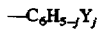

$-C_6H_{5-j}Y_j$ where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from $R_1$ or $R_2$, where $R_1$ is alkyl having from about 7 to about 10 carbon atoms; fluoro-substituted alkyl having from 2 to about 10 carbon atoms; substituted phenyl of the formula:

$-C_6H_{5-j}Y_j$ where j is 1 to 5, and Y is fluorine, phenyl or fluoro-substituted phenyl or $R_1$ is an organosiloxane of the formula:

$-W-\{[Si(R')_2-O-]_b[SiR'R''-O-]_c[Si(R')_2-O-]_d\}_kE$ where

E is $-Si(R')_3$, $-Si(R')_2(C_6H_5)$ or R''', k is 1 to 10, and R', R", R''', b, c and d are as defined above; and $R_2$ is selected from the group consisting of chlorine, bromine, methyl and trifluoromethyl;

provided that at least one R must be $R_1$.

33. A method for extracting cesium ions from an aqueous solution, comprising contacting the cesium ions with at least one extraction agent comprising a substituted dicarbaextrañide;

wherein the substituted dicarbaextrañide comprises:

a) a metal dicarbaextrañide ion of the formula:

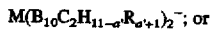

$M(B_{10}C_2H_{11-a'}R_{a'+1})_2^-$; or b) a metal dicarbaextrañide ion-substituted organosiloxane of the formula:

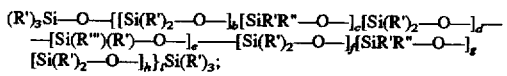

$(R')_3Si-O-\{[Si(R')_2-O-]_b[SiR'R''-O-]_c[Si(R')_2-O-]_d-$
$-[Si(R''')(R')-O-]_e-[Si(R')_2-O-]_f[SiR'R''-O-]_g$
$[Si(R')_2-O-]_h\}_iSi(R')_3$;

wherein M is a transition metal capable of forming a trivalent oxidation state;

R' is methyl or trifluoromethyl;

R" is phenyl or fluoro-substituted phenyl;

R''' is a metal dicarbaextrañide ion moiety of the formula:

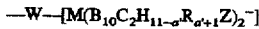

$-W-[M(B_{10}C_2H_{11-a'}R_{a'+1}Z)_2^-]$ where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

$-C_6H_{5-j}Y_j$ where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from $R_1$ or $R_2$, where $R_1$ is alkyl having from about 7 to about 10 carbon atoms; fluoro-substituted alkyl having from 2 to about 10 carbon atoms; substituted phenyl of the formula:

$-C_6H_{5-j}Y_j$ where j is 1 to 5, and Y is fluorine, phenyl or fluoro-substituted phenyl; or $R_1$ is an organosiloxane of the formula:

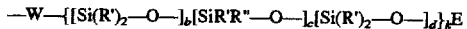

$-W-\{[Si(R')_2-O-]_b[SiR'R''-O-]_c[Si(R')_2-O-]_d\}_kE$ where

E is $-Si(R')_3$, $-Si(R')_2(C_6H_5)$ or R''', k is 1 to 10, and R', R", R''', b, c and d are as defined above; and $R_2$ is selected from the group consisting of chlorine, bromine, methyl and trifluoromethyl;

provided that at least one R must be $R_1$.

34. A method as recited in claim 33 wherein the cesium ions are contacted with the extraction agent by passing the aqueous solution through a semipermeable membrane or a microporous polymer film that comprises the extraction agent.

35. A method as recited in claim 34, wherein, prior to extraction, the membrane is treated with mineral acid.

36. A method for extracting strontium ions from an aqueous solution, comprising contacting the strontium ions, in the presence of a polyethylene glycol or p-nonaphenylnonaethylene glycol, with at least one an extraction agent comprising a substituted dicarbaextrañide;

wherein the substituted dicarbaextrañide comprises:

a) a metal dicarbaextrañide ion of the formula:

or b) a metal dicarbaextrañide ion-substituted organosiloxane of the formula;

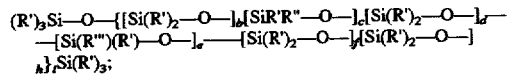

wherein M is a transition metal capable of forming a trivalent oxidation state;
R' is methyl or trifluorormethyl;
R" is phenyl or fluoro-substituted phenyl;
R'" is a metal dicarbaextrañide ion moiety of the formula:

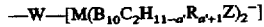

where W is oxygen or alkylene having from 2 to have 10 carbon atoms, and each Z is independently selected from hydrogen, alkyl having from about 1 to 10 carbon atoms; fluoro-substituted alkyl having from 1 to about 10 carbon atoms; phenyl or substituted phenyl of the formula:

where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from $R_1$ or $R_2$, where
$R_1$ is alkyl having from about 7 to about 10 carbon atoms; fluoro- substituted alkyl having from 2 to about 10 carbon atoms; substituted phenyl of the formula:

where j is 1 to 5, and Y is fluorine, phenyl or fluoro-substituted phenyl; or $R_1$ is an organosiloxane of the formula:

where
E is —Si(R')$_3$, —Si(R')$_2$(C$_6$H$_5$) or R'", k is 1 to 10, and R', R", R'", b, c and d are as defined above; and
$R_2$ is selected from the group consisting of chlorine, bromine, methyl and trifluoromethyl;
provided that at least one R must be $R_1$.

37. A method as recited in claim 36 wherein the strontium ions are contacted with the extraction agent by passing the aqueous solution through a semipermeable membrane or a microporous polymer film that comprises the extraction agent.

38. A method as recited in claim 37, wherein, prior to extraction, the membrane is treated with mineral acid.

39. A semipermeable membrane, comprising a silicone elastomer or microporous polymer film wherein the elastomer or film comprises at least one substituted dicarbaextrañide:

wherein the substituted dicarbaextrañide comprises:

a) a metal dicarbaextrañide ion of the formula:

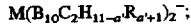

or b) a metal dicarbaextrañide ion-substituted organosiloxane of the formula:

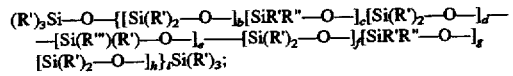

wherein
M is a transition metal capable of forming a trivalent oxidation state;
R' is methyl or trifluoromethyl;
R" is phenyl or fluoro-substituted phenyl;
R'" is a metal dicarbaextrañide ion moiety of the formula:

where W is oxygen or alkylene having from 2 to about 10 carbon atoms, and each Z is independently selected from hydrogen, alkyl having from about 1 to about 10 carbon atoms; fluoro-substituted alkyl having from 1 to about 10 carbon atoms; phenyl or substituted phenyl of the formula:

where j is 1 to 5, and Y is fluorine, phenyl or fluoro-substituted phenyl; a' is 0 to 4; b, d, f, and h are 0 to 10; c and g are 0 or 1; and e and i are 1 to 10; and each R is independently selected from $R_1$ or $R_2$, where
$R_1$ is alkyl having from about 7 to about 10 carbon atoms; fluoro-substituted alkyl having from 2 to about 10 carbon atoms; substituted phenyl of the formula:

where j is 1 to 5, and Y is fluorine, phenyl or fluoro-substituted phenyl; or $R_1$ is an organosiloxane of the formula:

where
E is —Si(R')$_3$, —Si(R')$_2$(C$_6$H$_5$) or R'", k is 1 to 10, and R', R", R'", b, c and d are as defined above; and
$R_2$ is selected from the group consisting of chlorine, bromine, methyl and trifluoromethyl;
provided that at least one R must be $R_1$.

40. A semipermeable membrane as recited in claim 39, wherein the semipermeable membrane comprises a silicone elastomer comprising an organosiloxane.

41. A semipermeable membrane as recited in claim 39, wherein the semipermeable membrane comprises a polypropylene polymer film.

* * * * *

UNITED STATES PATENT AND TRADEMARK OFFICE
CERTIFICATE OF CORRECTION

PATENT NO. : 5,698,169  
DATED : December 16, 1997  
INVENTOR(S) : M.F. Hawthorne et al.

Page 1 of 12

It is certified that error appears in the above-identified patent and that said Letters Patent is hereby corrected as shown below:

On the title page,

| COLUMN | LINE | |
|---|---|---|
| [63] Pg. 1, col. 1 | Related U.S. App. Data | "427,007," should read --427,077,-- |
| [56] Pg. 1, col. 2 | Refs. Cited (Other Publs., Item 5) | "Hybride" should read --Hydride-- |
| [56] Pg. 1, col. 2 | Refs. Cited (Other Publs., Item 8) | "of$^{137}$Cs" should read --of $^{137}$Cs-- |
| [56] Pg. 2, col. 1 | Refs. Cited (Other Publs., Item 14) | "of$^{90}$Sr" should read --of $^{90}$Sr-- |
| [56] Pg. 2, col. 1 | Refs. Cited (Other Publs., Item 21) | "Solutions -A" should read --Solutions - A-- |
| [56] Pg. 2, col. 2 | Refs. Cited (Other Publs., Item 24) | After "Muetterties" delete "." and insert therefor --,-- |
| [56] Pg. 2, col. 2 | Refs. Cited (Other Publs., Item 24) | After "(1975)" insert --.-- |

UNITED STATES PATENT AND TRADEMARK OFFICE
CERTIFICATE OF CORRECTION

PATENT NO. : 5,698,169
DATED : December 16, 1997
INVENTOR(S) : M.F. Hawthorne et al.

It is certified that error appears in the above-identified patent and that said Letters Patent is hereby corrected as shown below:

| COLUMN | LINE | |
|---|---|---|
| [56] Pg. 2, col. 2 | Refs. Cited (Other Publs., Item 33) | "$B_{10}C_2H_{12}{}^{2-}$and" should read --$B_{10}C_2H_{12}{}^{2-}$ and-- |
| [56] Pg. 2, col. 2 | Refs. Cited (Other Publs., Item 35) | "80:(1-2):49-54" should read --80(1-2):49-54-- |
| [56] Pg. 2, col. 2 | Refs. Cited (Other Publs., Item 36) | "$B_{12}H_{12}{}^{2-}$and" should read --$B_{12}H_{12}{}^{2-}$ and-- |
| 1 | 46 | "($t,\frac{1}{2}$=30.0" should read --($t_{\frac{1}{2}}$=30.0-- |
| 4 | 2 | Before "Rais et al.)" insert --(-- |
| 4 | 54 | "hexachloro-derivative," should read --hexachloro- derivative,-- |
| 4 | 55 | "(Maeasek" should read --(Macasek-- |
| 5 | 3 | "Selueky" should read --Selucky-- |
| 6 | 62 | "ions-and" should read --ions, and-- |
| 6 | 63 | "ions-including" should read --ions--including-- |

UNITED STATES PATENT AND TRADEMARK OFFICE
CERTIFICATE OF CORRECTION

PATENT NO. : 5,698,169
DATED : December 16, 1997
INVENTOR(S) : M.F. Hawthorne et al.

It is certified that error appears in the above-identified patent and that said Letters Patent is hereby corrected as shown below:

| COLUMN | LINE | |
|---|---|---|
| 11 | 32 | "$(-CH_z-)_{2-10}$," should read --$(-CH_2-)_{2-10}$,-- |
| 11 | 59 | Before "arenes" delete "$arSi(CH_3)_2$-" |
| 12 | 1 | "$CoCl_2 \cdot nH_2O$," should read --$CoCl_2 \cdot nH_2O$,-- |
| 12 | 45 | "$3CoCl_2 \cdot 6H2O$" should read --$3CoCl_2 \cdot 6H2O$-- |
| 12 | 59 | "$[Na^+]]B_9C_2H_{11}R^-]$" should read --$[Na^+][B_9C_2H_{11}R^-]$-- |
| 12 | 61 | "$[(CH_3)_3NH^+][B_9C_2H_{11}R]_{(ppt)}^-$" should read --$[(CH_3)_3NH^+][B_9C_2H_{11}R]^-_{(ppt)}$-- |
| 13 | 2 | "convened" should read --converted-- |
| 14 | 3 | "metacarbone" should read --metacarborane-- |
| 15 | 63 | "R-substituted" should read --$R_1$-substituted-- |
| 16 | 20-21 | "process" should read --proceeds-- |
| 16 | 21 | "lablie" should read --labile-- |
| 16 | 34 | "$Cs\{[8-(OH)-1,2-B_9C-_2H_{10}]_2Co\}$" should read --$Cs\{[8-(OH)-1,2-B_9C_2H_{10}]_2Co\}$-- |

UNITED STATES PATENT AND TRADEMARK OFFICE
CERTIFICATE OF CORRECTION

PATENT NO. : 5,698,169
DATED : December 16, 1997
INVENTOR(S) : M.F. Hawthorne et al.

Page 4 of 12

It is certified that error appears in the above-identified patent and that said Letters Patent is hereby corrected as shown below:

| COLUMN | LINE | |
|---|---|---|
| 16 | 40 | "-Si(CH$_3$)$_2$-O-CH$_2$CH$_2$" should read ---Si(CH$_3$)$_2$-CH$_2$CH$_2$-- |
| 16 | 56 | "(L)" should read --(:L)-- |
| 17 | 7 | After the formula, insert --(ii)-- to line up directly under "(i)" above it. |
| 17 | 13 | "3COCl$_2$" should read --3CoCl$_2$-- |
| 17 | 17 | "convened" should read --converted-- |
| 17 | 37 | "[M(B$_{10}$C$_2$H$_{11}$)$_2$]$^-$." should read --[M(B$_{10}$C$_2$H$_{11}$R)$_2$]$^-$.-- |
| 17 | 41 | "[M(B$_{10}$C$_2$H$_{11}$)$_2$]$^-$" should read --[M(B$_{10}$C$_2$H$_{11}$I)$_2$]$^-$-- |
| 18 | 25 | "-O-]Si(CH$_3$)$_2$" should read ---O-[Si(CH$_3$)$_2$-- |
| 18 | 27 | "(CH$_3$)$_2$-CH$_2$" should read --(CH$_3$)$_2$-O-]$_n$-Si(CH$_3$)$_2$-CH$_2$-- |
| 18 | 36 | "C$_6$H$_5$])}." should read --C$_6$H$_5$]}.-- |
| 19 | 54 | "fight" should read --right-- |

UNITED STATES PATENT AND TRADEMARK OFFICE
CERTIFICATE OF CORRECTION

PATENT NO. : 5,698,169
DATED : December 16, 1997
INVENTOR(S) : M.F. Hawthorne et al.

It is certified that error appears in the above-identified patent and that said Letters Patent is hereby corrected as shown below:

| COLUMN | LINE | |
|---|---|---|
| 19 | 60 | "PEG400)" should read --PEG-400)-- |
| 21 | 54 | "(d)forming" should read --(d) forming-- |
| 22 | 36 | After "compartment" (first occurrence) insert --(B)-- |
| 23 | 64 | "dicarbaextrañlyl" should read --dicarbaextrañyl-- |
| 23 | 65 | "*J. AM.*" should read --*J. Am.*-- |
| 24 | 51 | "perfluoroallcyl" should read --perfluoroalkyl-- |
| 24 | 66 | "$CoCl_2.6$" should read --$CoCl_2 \cdot 6$-- |
| 25 | 7 | "Bis[6=" should read --Bis[6--- |
| 25 | 16 | "dicarbacloso" should read --dicarba*closo*-- |
| 25 | 27 | "stiffer" should read --stirrer-- |
| 25 | 34 | "mount" should read --amount-- |
| 26 | 14 | "$Na_2SO_3.7$" should read --$Na_2SO_3 \cdot 7$-- |
| 26 | 20 | "Cs{[S-(I)" should read --Cs{[8-(I)-- |
| 27 | 15 | "star" should read --started-- |

UNITED STATES PATENT AND TRADEMARK OFFICE
CERTIFICATE OF CORRECTION

PATENT NO. : 5,698,169
DATED : December 16, 1997
INVENTOR(S) : M.F. Hawthorne et al.

It is certified that error appears in the above-identified patent and that said Letters Patent is hereby corrected as shown below:

| COLUMN | LINE | |
|---|---|---|
| 27 | 19 | "2-$C_1C_4H_9$" should read --2-$ClC_4H_9$-- |
| 27 | 26 | "[1,2-$B_9C_2H_{10}$]}" should read --[1-$CH_3$-1,2-$B_9C_2H_{10}$]}-- |
| 27 | 30-31 | "1-$CH_2$-1,2-$B_{10}C_2H_{11}$-1-$BrCH_2$-$B_{10}C_2H_1$]," should read --1-$CH_3$-1,2-$B_{10}C_2H_{11}$, 1-$BrCH_2$-$B_{10}C_2H_{11}$-- |
| 27 | 43 | "eta.," should read --et al.,-- |
| 27 | 63 | "from" should read --form-- |
| 28 | 8 | "-O-]Si" should read ---O-[Si-- |
| 28 | 40 | "mounts" should read --amounts-- |
| 28 | 52 | After "stirring" insert --,-- |
| 28 | 52 | "7.7g(16 mmol)" should read --7.7g (16 mmol)-- |
| 30 | 58 | "fired" should read --fitted-- |
| 31 | 17-18 | "convened" should read --converted-- |

UNITED STATES PATENT AND TRADEMARK OFFICE
CERTIFICATE OF CORRECTION

PATENT NO. : 5,698,169

DATED : December 16, 1997

INVENTOR(S) : M.F. Hawthorne et al.

It is certified that error appears in the above-identified patent and that said Letters Patent is hereby corrected as shown below:

| COLUMN | LINE | |
|---|---|---|
| 32 | 16 | "Cesium{[1 1-" should read --Cesium{[11--- |
| 32 | 29 | "[7,9-$B_{11}C_2H_{12}$]}" should read --[7,9-$B_{10}C_2H_{12}$]}-- |
| 32 | 64 | "(n-perfluoroacyl)" should read --(n-perfluorooctyl)-- |
| 32 | 66 | "fluoro" should read --fluoro--- |
| 33 | 3 | "per-fluoroalkyl" should read --perfluoroalkyl-- |
| 34 (Claim 1, | 36 line 3) | "a) metal" should read --a) a metal-- |
| 35 (Claim 1, | 2 line 28) | After "and" (third occurrence) delete ";" |
| 35 (Claim 1, | 3 line 29) | "$R_1$ and $R_2$," should read --$R_1$ or $R_2$,-- |
| 35 (Claim 4, | 33 line 5) | "-C-$H_{5-j}Y_j$" should read ---$C_6H_{5-j}Y_j$-- |
| 35 (Claim 5, | 42 line 4) | "-Si(R'$_3$, -Si(R'$_2$($C_6H_5$)" should read ---Si(R')$_3$, -Si(R')$_2$($C_6H_5$)-- |
| 36 (Claim 9, | 34 line 9) | "[Si(R''' )" should read --[Si(R''')-- |

UNITED STATES PATENT AND TRADEMARK OFFICE
CERTIFICATE OF CORRECTION

PATENT NO. : 5,698,169  
DATED : December 16, 1997  
INVENTOR(S) : M.F. Hawthorne et al.

It is certified that error appears in the above-identified patent and that said Letters Patent is hereby corrected as shown below:

| COLUMN | LINE | | |
|---|---|---|---|
| 36 (Claim 9, | 34 line 9) | "]Si" should read --[Si-- | |
| 36 (Claim 9, | 48 line 20) | After "atoms" insert --,-- | |
| 36 (Claim 9, | 55 line 26) | After "5" insert --,-- | |
| 36 (Claim 9, | 57 line 28) | "c and are" should read --c and g are-- | |
| 36 (Claim 9, | 59 line 30) | After "alkyl" insert --having-- | |
| 37 (Claim 9, | 5 line 40) | "above;and" should read --above; and-- | |
| 37 (Claim 9, | 7 line 42) | After "trifluoromethyl" delete "," and insert therefor --;-- | |
| 37 (Claim 10, | 9-10 lines 1-2) | "dicarbaextranide" should read --dicarbaextrañide-- | |
| 37 (Claim 10, | 12 line 3) | "$\{[Si(R')_2\text{-}O\text{-}]b\}$" should read --$\{[Si(R')_2\text{-}O\text{-}]_b\}$-- | |

UNITED STATES PATENT AND TRADEMARK OFFICE
CERTIFICATE OF CORRECTION

PATENT NO. : 5,698,169      Page 9 of 12
DATED : December 16, 1997
INVENTOR(S) : M.F. Hawthorne et al.

It is certified that error appears in the above-identified patent and that said Letters Patent is hereby corrected as shown below:

COLUMN     LINE 37    66 *through*    Please delete text of Claim 13. Claim 13 should read
38    12    as follows:
(Claim 13, all)    --An extraction agent as recited in Claim 10, selected from the group consisting of bis[1-(n-hexyl)-dicarbaextrañyl]metal anion substituted silicone, bis[1-(n-hexyl)-dicarbaextrañyl]metal anion substituted silicone, bis[1-(n-octyl)-dicarbaextrañyl]metal anion substituted silicone, bis[1-(n-nonyl)-dicarbaextrañyl]metal anion substituted silicone, and bis[1-(n-decyl)-dicarbaextrañyl]metal anion substituted silicone.--

38    60    "fluoro substituted" should read --fluoro- substituted--
(Claim 14, line 42)

39    10    "if" should read --of--
(Claim 15, line 2)

39    29    Before "an" delete "a"
(Claim 20, line 2)

39    29    "organo-siloxane-substituted" should read
(Claim 20, line 2)    --organosiloxane-substituted--

39    62    "[Si(R')$_2$-O-]-" should read --[Si(R')$_2$-O-]$_d$---
(Claim 23, line 22)

UNITED STATES PATENT AND TRADEMARK OFFICE
CERTIFICATE OF CORRECTION

PATENT NO. : 5,698,169  
DATED : December 16, 1997  
INVENTOR(S) : M.F. Hawthorne et al.

Page 10 of 12

It is certified that error appears in the above-identified patent and that said Letters Patent is hereby corrected as shown below:

| COLUMN | LINE | |
|---|---|---|
| 40 (Claim 23, | 2 line 29) | Begin a new line with "R'" is a metal . . ." |
| 40 (Claim 23, | 8 line 33) | After "atoms" delete ";" and insert therefor --,-- |
| 40 (Claim 23, | 15 line 39) | After "1 to 5" insert --,-- |
| 40 (Claim 23, | 16 line 40) | "0to 4," should read --0 to 4;-- |
| 40 (Claim 23, | 17 line 41) | "0to 10;" should read --0 to 10;-- |
| 40 (Claim 23, | 20 line 44) | After "alkyl" insert --having-- |
| 40 (Claim 23, | 22 line 46) | After "phenyl" delete "1" |
| 40 (Claim 23, | 32 line 53) | After "1 to 10" insert --,-- |
| 40 (Claim 25, | 44 line 4) | "hydrocarbons" should read --hydrocarbon-- |

UNITED STATES PATENT AND TRADEMARK OFFICE
CERTIFICATE OF CORRECTION

PATENT NO. : 5,698,169

DATED : December 16, 1997

INVENTOR(S) : M.F. Hawthorne et al.

It is certified that error appears in the above-identified patent and that said Letters Patent is hereby corrected as shown below:

| COLUMN | LINE | |
|---|---|---|
| 41 (Claim 32, | 64 line 58) | After "phenyl" insert --;-- |
| 42 (Claim 32, | 2 line 62) | After "1 to 10" insert --,-- |
| 42 (Claim 33, | 57 line 42) | "-Si(R')$_3$'," should read ---Si(R')$_3$,-- |
| 43 (Claim 36, | 12 line 8) | "R$_{a'}$-1)$_2^-$;" should read --R$_{a'}$+1)$_2^-$;-- |
| 43 (Claim 36, | 16 line 11) | After "formula" delete ";" and insert therefor --:-- |
| 43 (Claim 36, | 19 line 13) | After "Si(R')$_2$-O-]$_f$" insert --[SiR'R"-O-]$_g$-- |
| 43 (Claim 36, | 23 line 17) | "trifluorormethyl;" should read --trifluoromethyl;-- |
| 43 (Claim 36, | 31 line 23) | "have 10" should read --about 10-- |
| 43 (Claim 36, | 33 line 25) | Before "10" insert --about-- |

UNITED STATES PATENT AND TRADEMARK OFFICE
CERTIFICATE OF CORRECTION

PATENT NO. : 5,698,169

DATED : December 16, 1997

INVENTOR(S) : M.F. Hawthorne et al.

It is certified that error appears in the above-identified patent and that said Letters Patent is hereby corrected as shown below:

COLUMN     LINE

44     25     "$R_{1'+1}$" should read --$R_{a'+1}$--
(Claim 39, line 21)

Signed and Sealed this

Eleventh Day of May, 1999

Attest:

Q. TODD DICKINSON

*Attesting Officer*     *Acting Commissioner of Patents and Trademarks*